US008185381B2

(12) United States Patent
Ryu et al.

(10) Patent No.: US 8,185,381 B2
(45) Date of Patent: May 22, 2012

(54) UNIFIED FILTER BANK FOR PERFORMING SIGNAL CONVERSIONS

(75) Inventors: Sang-Uk Ryu, Goleta, CA (US); Eddie L. T. Choy, Carlsbad, CA (US); Nidish Ramachandra Kamath, San Diego, CA (US); Samir Kumar Gupta, San Diego, CA (US); Suresh Devalapalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 979 days.

(21) Appl. No.: 12/174,498

(22) Filed: Jul. 16, 2008

(65) Prior Publication Data

US 2009/0024397 A1 Jan. 22, 2009

Related U.S. Application Data

(60) Provisional application No. 60/950,775, filed on Jul. 19, 2007.

(51) Int. Cl.

| | |
|---|---|
| ***G10L 11/00*** | (2006.01) |
| ***G10L 19/00*** | (2006.01) |
| ***G09G 5/00*** | (2006.01) |
| ***H04H 20/71*** | (2008.01) |
| ***H04L 27/10*** | (2006.01) |
| *H04J 3/00* | (2006.01) |
| *H04K 1/02* | (2006.01) |

(52) U.S. Cl. ............ 704/200; 345/8; 370/312; 370/345; 375/273; 375/274; 375/296; 704/9; 704/203; 704/500; 704/502; 704/503; 714/707

(58) Field of Classification Search ...... 345/8; 370/312, 370/345; 375/273, 274; 704/9, 200, 500–504
See application file for complete search history.

(56) References Cited

U.S. PATENT DOCUMENTS 5,845,249 A 12/1998 Malladi et al.
2007/0250308 A1 * 10/2007 Lee et al. ...................... 704/200

OTHER PUBLICATIONS

International Search Report—PCT/US08/070549—International Search Authority, European Patent Office—Sep. 23, 2008.
Written Opinion—PCT/US08/070549—International Search Authority, European Patent Office—Sep. 23, 2008.
Tsung-Han Tsai, et al., "A configurable common filterbank processor for AC-3, MP3 and AAC decoder," Proceedings of the 17th VLSI Design/CAD Symposium, Aug. 11, 2006, pp. 1-6.
Yin-Tsung Hwang et al., "A novel MDCT/IMDCT computing kernel design," Signal Processing Systems Design and Implementation, 2005. IEEE workshop on Athens, Greece Nov. 204, 2005, Piscataway, NJ, USA, IEEE, Nov. 2, 2005, pp. 526-531.
Ie Lau et al, "A common transform engine for MPEG & AC3 Audio Decoder," vol. 43, No. 3, Aug. 1, 1997, pp. 559-566.

* cited by examiner

*Primary Examiner* — Justin Rider
(74) *Attorney, Agent, or Firm* — Espartaco Diaz Hidalgo

(57) ABSTRACT

A unified filter bank for performing signal conversions may include an interface that receives signal conversion commands in relation to multiple types of compressed audio bitstreams. The unified filter bank may also include a reconfigurable transform component that performs a transform as part of signal conversion for the multiple types of compressed audio bitstreams. The unified filter bank may also include complementary modules that perform complementary processing as part of the signal conversion for the multiple types of compressed audio bitstreams. The unified filter bank may also include an interface command controller that controls the configuration of the reconfigurable transform component and the complementary modules.

40 Claims, 26 Drawing Sheets

UNIFIED FILTER BANK FOR PERFORMING SIGNAL CONVERSIONS

RELATED APPLICATIONS

The present Application for Patent claims priority to Provisional Application No. 60/950,775 entitled "UNIFIED DOMAIN CONVERSION FOR DIGITAL AUDIO PLAYBACK SYSTEM" filed Jul. 19, 2007, and assigned to the assignee hereof and hereby expressly incorporated by reference herein.

TECHNICAL FIELD

The present disclosure relates generally to computers and computer-related technology. More specifically, the present disclosure relates to audio processing techniques that may be utilized in computing devices, including mobile computing devices, portable media players, mp3 players, PDAs, etc.

BACKGROUND

The term audio processing may refer to the processing of audio signals. Audio signals are electrical signals that represent audio, i.e., sounds that are within the range of human hearing. Audio signals may be either

DETAILED DESCRIPTION

Figure 1:
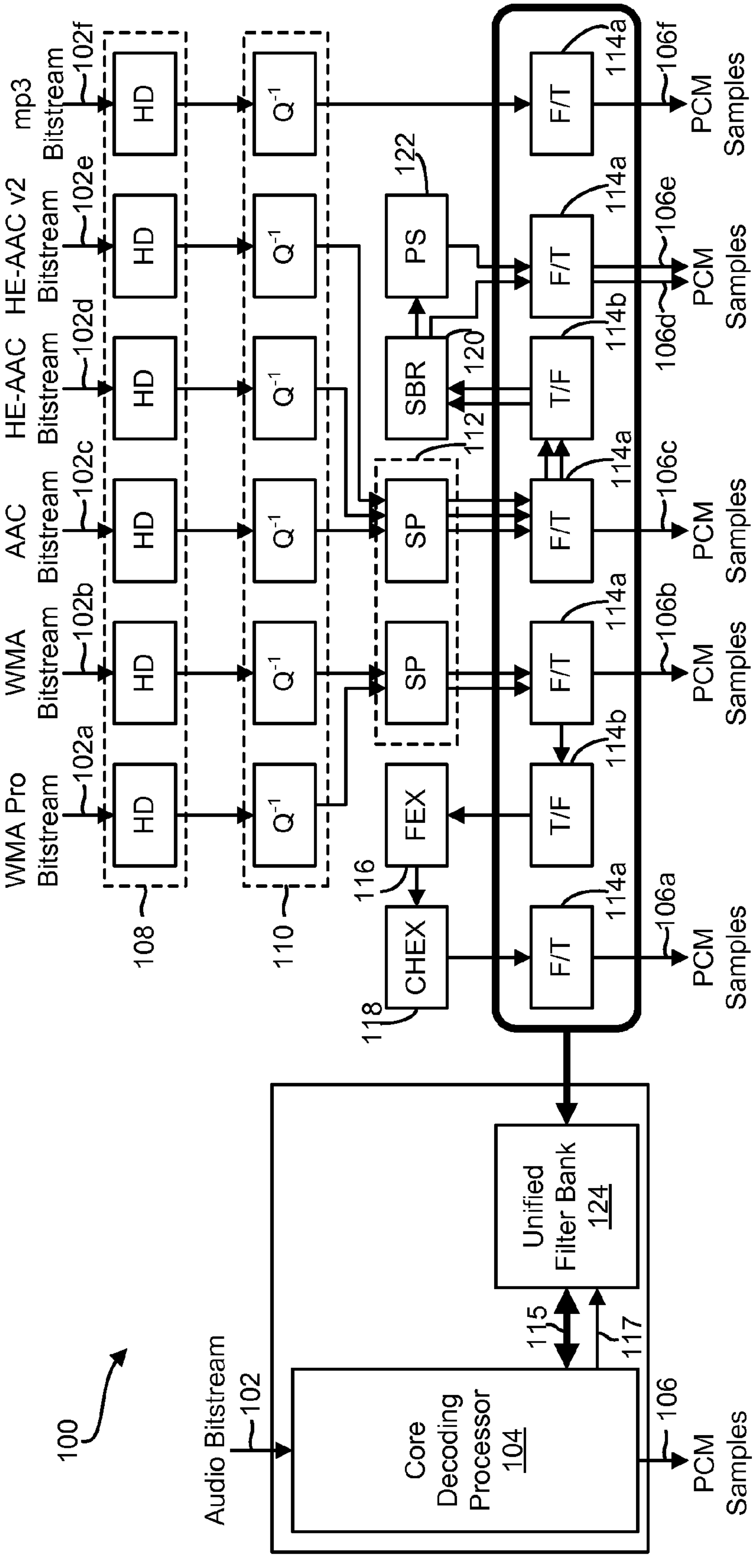
FIG. 1 illustrates an audio playback system that utilizes a unified filter bank.

A unified filter bank for performing signal conversions is disclosed. The unified filter bank may include an interface that receives signal conversion commands and accompanying data in relation to multiple types of compressed audio bitstreams. The unified filter bank may also include a reconfigurable transform component that performs a transform as part of signal conversion for the multiple types of compressed audio bitstreams. The unified filter bank may also include complementary modules that perform complementary processing as part of the signal conversion for the multiple types of compressed audio bitstreams. The unified filter bank may also include an interface command controller that controls the configuration of the reconfigurable transform component, the configuration of the complementary modules, and the order in which the complementary modules are connected and executed.

A method for implementing a unified filter bank that performs signal conversions is also disclosed. The method may include receiving signal conversion commands and accompanying data in relation to multiple types of compressed audio bitstreams. The method may also include performing at least one transform as part of signal conversion for the multiple types of compressed audio bitstreams. The method may also include performing complementary processing as part of the signal conversion for the multiple types of compressed audio bitstreams. The method may also include controlling the configuration of a reconfigurable transform component that performs the at least one transform, the configuration of complementary modules that perform the complementary processing, and the order in which the complementary modules are connected and executed.

An apparatus for implementing a unified filter bank that performs signal conversions is also disclosed. The apparatus may include means for receiving signal conversion commands and accompanying data in relation to multiple types of compressed audio bitstreams. The apparatus may also include means for performing at least one transform as part of signal conversion for the multiple types of compressed audio bitstreams. The apparatus may also include means for performing complementary processing as part of the signal conversion for the multiple types of compressed audio bitstreams. The apparatus may also include means for controlling the configuration of a reconfigurable transform component that performs the at least one transform, the configuration of complementary modules that perform the complementary processing, and the order in which the complementary modules are connected and executed.

A computer-readable medium for implementing a unified filter bank is also disclosed. The computer-readable medium may include instructions which, when executed by a processor, cause the processor to receive signal conversion commands and accompanying data in relation to multiple types of compressed audio bitstreams. The instructions may also cause the processor to perform at least one transform as part of signal conversion for the multiple types of compressed audio bitstreams. The instructions may also cause the processor to perform complementary processing as part of the signal conversion for the multiple types of compressed audio bitstreams. The instructions may also cause the processor to control the configuration of a reconfigurable transform component that performs the at least one transform, the configuration of complementary modules that perform the complementary processing, and the order in which the complementary modules are connected and executed.

An integrated circuit for implementing a unified filter bank is also disclosed. The integrated circuit may be configured to receive signal conversion commands and accompanying data in relation to multiple types of compressed audio bitstreams. The integrated circuit may also be configured to perform at least one transform as part of signal conversion for the multiple types of compressed audio bitstreams. The integrated circuit may also be configured to perform complementary processing as part of the signal conversion for the multiple types of compressed audio bitstreams. The integrated circuit may also be configured to control the configuration of a reconfigurable transform component that performs the at least one transform, the configuration of complementary modules that perform the complementary processing, and the order in which the complementary modules are connected and executed.

FIG. 1 illustrates an audio playback system 100 that utilizes a unified filter bank. The system 100 is shown with a core decoding processor 104. The core decoding processor 104 may be configured to process an input audio bitstream 102, and output decoded pulse-code modulated (PCM) samples 106.

The core decoding processor 104 may be configured to decode compressed audio of a variety of different formats. Some examples of compressed audio formats that may be supported by the core decoding processor 104 include MPEG-1 Audio Layer 3 (MP3), Advanced Audio Coding (AAC), High Efficiency AAC (HE-AAC), HE-AAC version 2 (HE-AAC v2), Windows Media Audio (WMA), WMA Pro, Dolby AC-3, Dolby eAC-3, Digital Theater System (DTS), etc. This list of audio formats is provided for purposes of example only. The methods described herein may be used in the decoding of other audio formats in addition to those specifically listed here.

The decoding steps for some compressed audio formats are shown in FIG. 1. For example, decoding a WMA Pro bitstream 102*a* may involve Huffman decoding 108, inverse quantization 110, spectral processing 112, frequency-to-time conversion 114*a*, time-to-frequency conversion 114*b*, frequency extension processing 116, channel extension processing 118, and another frequency-to-time conversion 114*a*, resulting in decoded PCM samples 106*a*.

As another example, decoding a WMA bitstream 102*b* may involve Huffman decoding 108, inverse quantization 110, spectral processing 112, and frequency-to-time conversion 114*a*, resulting in decoded PCM samples 106*b*.

As another example, decoding an AAC bitstream 102*c* may involve Huffman decoding 108, inverse quantization 110, spectral processing 112, and frequency-to-time conversion 114*a*, resulting in decoded PCM samples 106*c*.

As another example, decoding an HE-AAC bitstream 102*d* may involve Huffman decoding 108, inverse quantization 110, spectral processing 112, frequency-to-time conversion 114*a*, time-to-frequency conversion 114*b*, spectral band replication processing 120, and another frequency-to-time conversion 114*a*, resulting in decoded PCM samples 106*d*.

As another example, decoding an HE-AAC v2 bitstream 102*e* may involve Huffman decoding 108, inverse quantization 110, spectral processing 112, frequency-to-time conversion 114*a*, time-to-frequency conversion 114*b*, spectral band replication processing 120, parametric stereo processing 122, and another frequency-to-time conversion 114*a*, resulting in decoded PCM samples 106*e*.

As another example, decoding an MP3 bitstream 102*f* may involve Huffman decoding 108, inverse quantization 110, and frequency-to-time conversion 114*a*, resulting in decoded PCM samples 106*f*.

The decoding steps other than frequency-to-time and/or time-to-frequency conversions 114 may be performed by the core decoding processor 104. The frequency-to-time and/or time-to-frequency conversions 114 may be performed by the unified filter bank block 124. In other words, whenever a time-to-frequency conversion or a frequency-to time conversion is to be performed as part of the process of decoding an input audio bitstream 102, the core decoding processor 104 may make a call to the unified filter bank block 124, which may perform the corresponding conversion. The unified filter bank block 124 may be able to perform all the conversions 114 regardless of the format of the audio bitstream 102 that is being decoded. In other words, the unified filter bank block 124 may be configured to perform the conversions 114 for different types of compressed audio formats.

An interface 115 is shown between the core decoding processor 104 and the unified filter bank block 124. The interface 115 facilitates communication between the core decoding processor 104 and the unified filter bank block 124. The core decoding processor 104 may send time-to-frequency or time-to-frequency conversion command(s) 117 to the unified filter bank block 124 via the interface 115. The unified filter bank block 124 may perform the corresponding conversion(s) in response to receiving the conversion command(s) 117 from the core decoding processor 104. Once the unified filter bank block 124 performs conversions, it may send a message back to the core decoding processor 104 indicating that it is done with the conversion process. The message may be sent via the interface 115.

Figure 2:
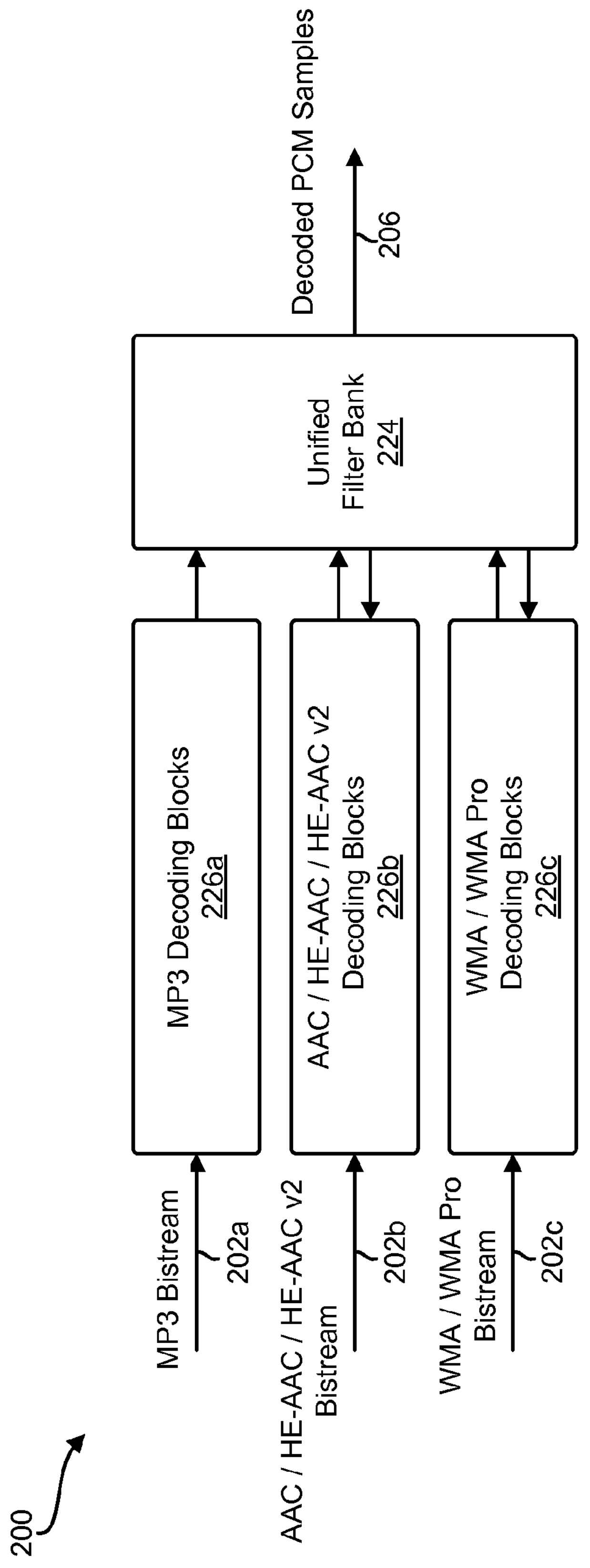
FIG. 2 illustrates another audio playback system that utilizes a unified filter bank.

FIG. 2 illustrates another audio playback system 200 that utilizes a unified filter bank. The system 200 is shown with MP3 decoding blocks 226*a*, AAC/HE-AAC/HE-AAC v2 decoding blocks 226*b*, and WMA/WMA Pro decoding blocks 226*c*. The MP3 decoding blocks 226*a*, the AAC/HE-AAC/HE-AAC v2 decoding blocks 226*b*, and the WMA/WMA Pro decoding blocks 226*c* may be configured to perform decoding steps other than time-to-frequency and/or frequency-to-time conversions with respect to an MP3 bitstream 202*a*, an AAC/HE-AAC/HE-AAC v2 bitstream 202*b*, and a WMA/WMA Pro bitstream 202*c*, respectively. A unified filter bank block 224 may be configured to perform time-to-frequency and/or frequency-to-time conversions. The unified filter bank block 224 is shown outputting decoded PCM samples 206.

Figure 2A:
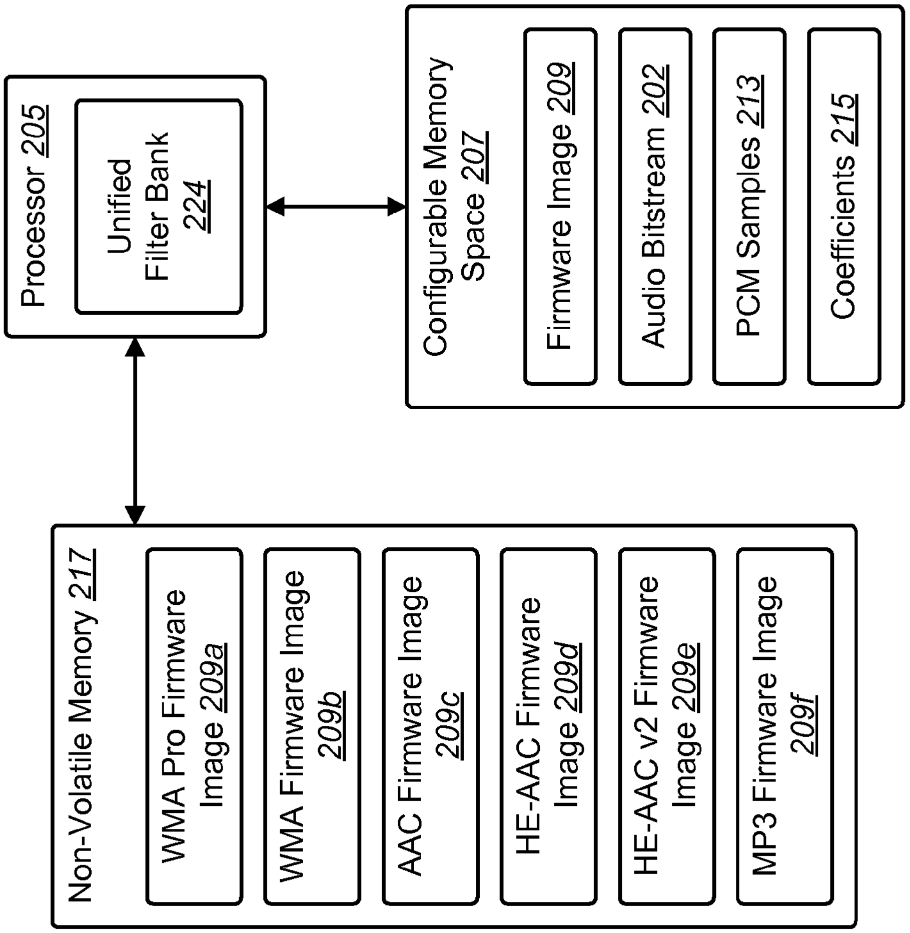
FIG. 2A illustrates one possible implementation of certain components in the system of FIG. 2.

Referring to FIG. 2A, the unified filter bank 224 may be implemented by a processor 205. The processor 205 may be in electronic communication with a configurable memory space 207.

There may be a separate firmware image 209 stored in non-volatile memory 217 for each type of decoder. For example, there may be a firmware image 209*a* corresponding to a WMA Pro decoder, a firmware image 209*b* corresponding to a WMA decoder, a firmware image 209*c* corresponding to an AAC decoder, a firmware image 209*d* corresponding to an HE-AAC decoder, a firmware image 209*e* corresponding to an HE-AAC v2 decoder, a firmware image 209*f* corresponding to an mp3 decoder, etc.

When an audio bitstream 102 is being decoded, the processor 205 may load the firmware image 209 that corresponds to the appropriate decoder into the memory space 207. For example, if an MP3 bitstream 102*f* is being decoded, then the processor 205 may load the MP3 firmware image 209*f* into the memory space 207.

The memory space 207 may be used to store various kinds of information during decoding. For example, audio bitstreams 202 may be stored in the memory space 207. As another example, PCM samples 213 (which may be the end result of the decoding process, and/or which may be produced during intermediate stages of the decoding process) may be stored in the memory space 207. As another example, coefficients 215 that may be utilized during the decoding process may be stored in the memory space 207.

Figure 2B:
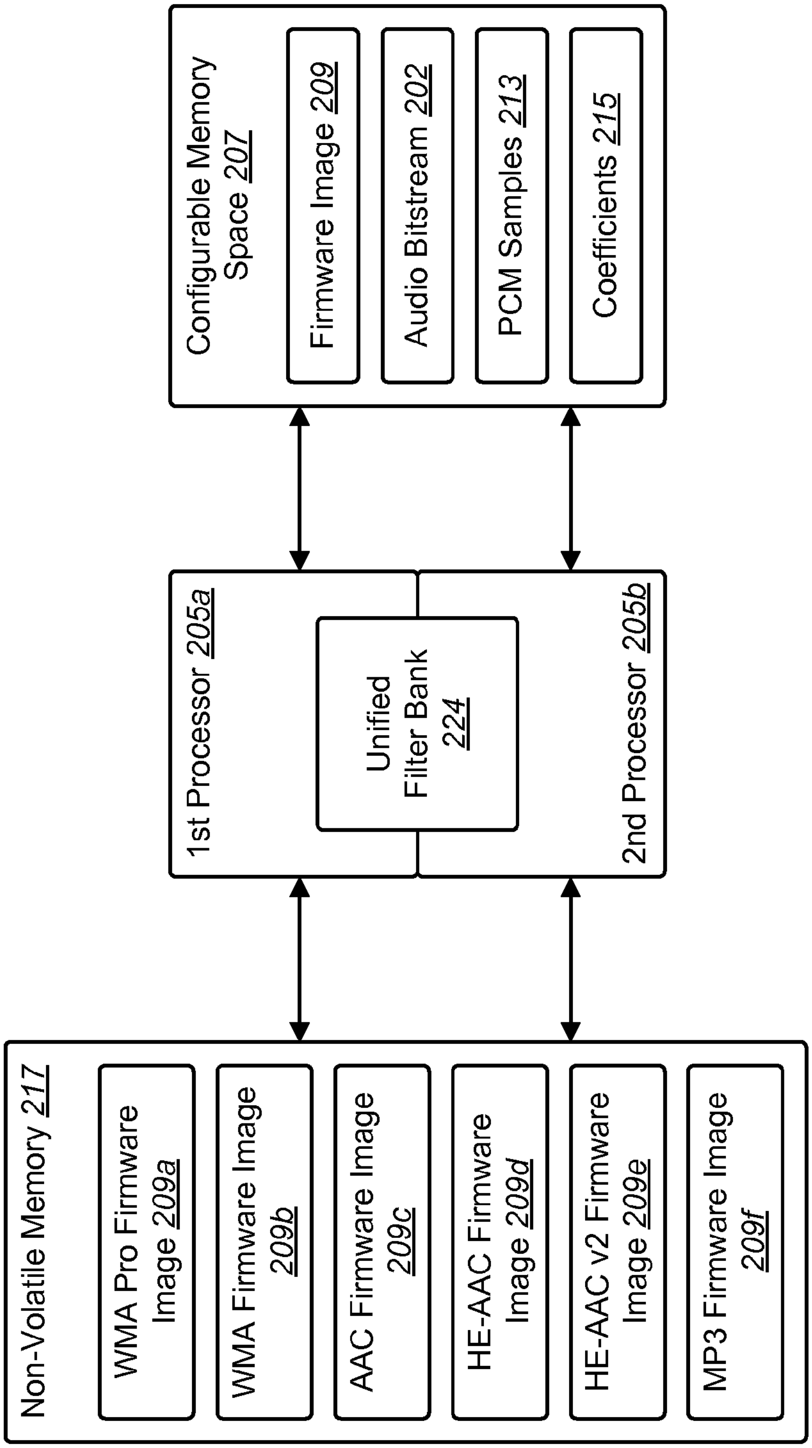
FIG. 2B illustrates another possible implementation of certain components in the system of FIG. 2.

Alternatively, referring to FIG. 2B, the unified filter bank 224 may be implemented across multiple processors, such as the first processor 205*a* and the second processor 205*b* shown in FIG. 2B. The configurable memory space 207 may be shared between the first processor 205*a* and the second processor 205*b*. The non-volatile memory 217 may also be shared between the first processor 205*a* and the second processor 205*b*.

As used herein, the term "processor" may refer to any general purpose single- or multi-chip microprocessor, such as an ARM, or any special purpose microprocessor such as a digital signal processor (DSP), a microcontroller, a programmable gate array, etc. In some configurations, a combination of processors (e.g., an ARM and DSP) could be used to perform the functions of the unified filter bank 224.

Figure 3:
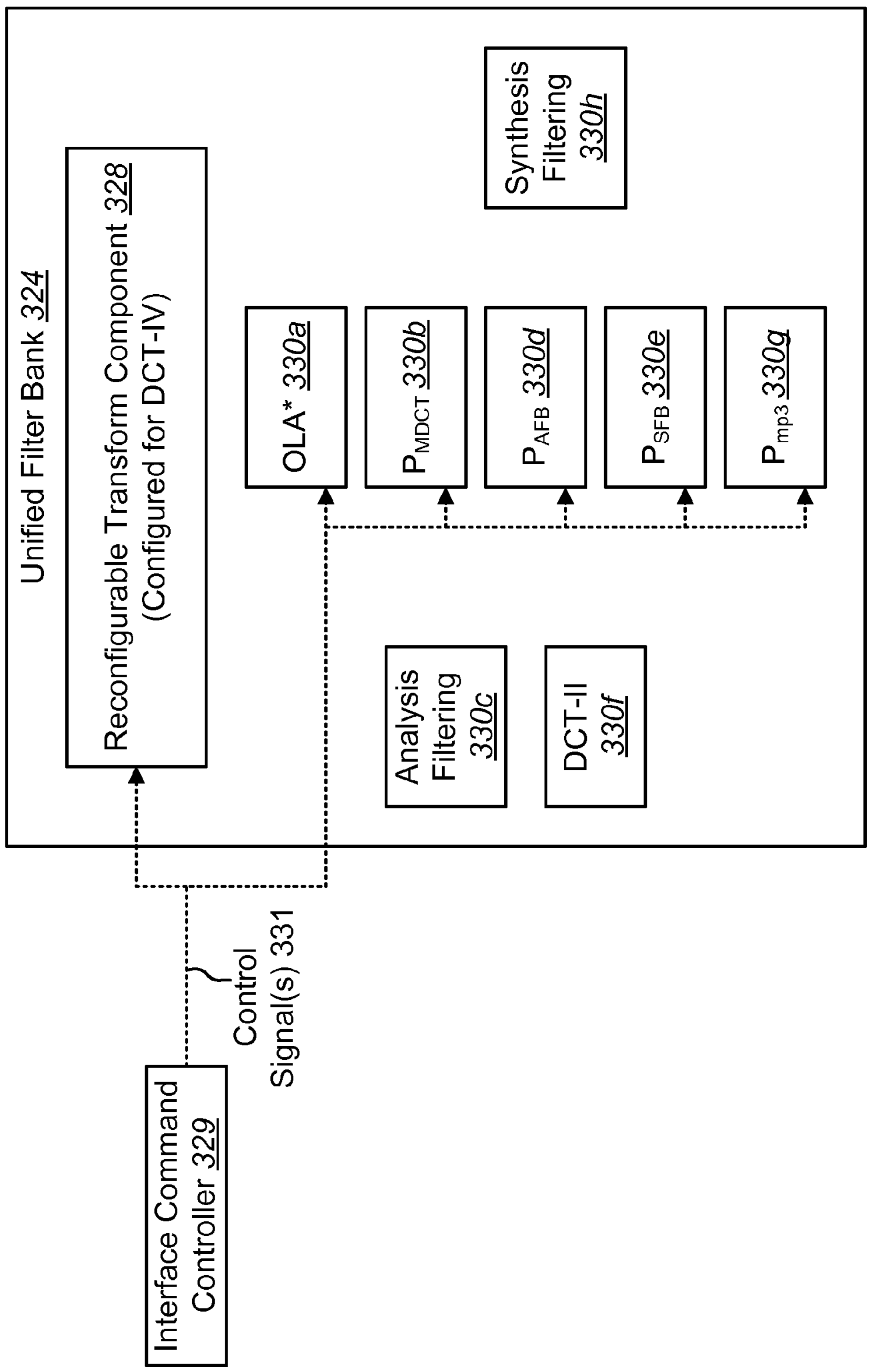
FIG. 3 illustrates an example of a unified filter bank block and an interface command controller.

FIG. 3 illustrates an example of a unified filter bank block 324. The unified filter bank block 324 may be used as the unified filter bank block 124 in the audio playback system 100 of FIG. 1 and/or the unified filter bank block 224 in the audio playback system 200 of FIG. 2.

The unified filter bank block 324 is shown with a transform component 328. The transform component 328 may be reconfigurable, i.e., it may be configured in different ways to implement different types of transforms. Some examples of transforms that may be implemented by the reconfigurable transform component 328 include the type-I discrete cosine transform (DCT-I transform), the type-II discrete cosine transform (DCT-II transform), the type-III discrete cosine transform (DCT-III transform), the type-IV discrete cosine transform (DCT-IV transform), the Fast Fourier transform (FFT), etc.

The unified filter bank block 324 is also shown with various complementary modules 330. These complementary modules 330 may perform various complementary processing operations, such as permutations. The specific configuration of at least some of the complementary modules 330 (e.g., the complementary modules 330 that implement permutations) may change depending on the type of transform that is being implemented by the reconfigurable transform component 328.

As shown, an interface command controller 329 may send control signal(s) 331 to the reconfigurable transform component 328 and to at least some of the complementary modules 330. The transform that is implemented by the reconfigurable transform component 328 at any given time may depend on the control signal(s) 331 received from the interface command controller 329. In addition, the configuration of at least some of the complementary modules 330 (e.g., the complementary modules 330 that implement permutations) may depend on the control signal(s) 331 received from the interface command controller 329. The control signals 331 may also cause appropriate data path connections to be established between the various components. The control signals 331 may also specify the order in which the components are executed.

In FIG. 3, the unified filter bank 324 includes a reconfigurable transform component 328 that may be configured in different ways to implement different types of transforms. However, as an alternative, a unified filter bank may be implemented with just a single, non-reconfigurable transform component, instead of a reconfigurable transform component 328. In other words, the unified filter bank may be implemented with a transform component that is configured to implement a single transform, and its corresponding complementary modules.

Referring again to the unified filter bank 324 that is shown in FIG. 3, there may be two separate control signals 331 that the interface command controller 329 sends to the complementary modules 330*a*, 330*b*, 330*d*, 330*e*, 330*g*. The first signal may include a command to change configurations. The second signal may include specific parameters that may be used to implement the configuration change. Alternatively, the interface command controller 329 may send a single control signal 331 to the complementary modules 330*a*, 330*b*, 330*d*, 330*e*, 330*g*, and this single control signal may include both the command to change configurations and the specific parameters for implementing the configuration change.

The complementary modules 330 may include a component 330*a* that performs an optimized overlap/add operation. This component 330*a* may be referred to as an optimized overlap/add operation component 330*a*. The optimized overlap/add operation will be described below.

The complementary modules 330 may also include a component 330*b* that performs a permutation that may be relevant to the modified discrete cosine transform (MDCT transform). This type of permutation may be referred to as an MDCT permutation, and the component 330*b* that performs this permutation may be referred to as an MDCT permutation component 330*b*. The MDCT permutation will be described below.

The complementary modules 330 may also include a component 330*c* that performs analysis polyphase filtering. This component 330*c* may be referred to as an analysis polyphase filtering component 330*c*. Analysis polyphase filtering will be described below.

The complementary modules 330 may also include a component 330*d* that performs a permutation that may be relevant to implementing an analysis filter bank. This type of permutation may be referred to as an analysis filter bank permutation, and the component 330*d* that implements this permutation may be referred to as an analysis filter bank permutation component 330*d*. The analysis filter bank permutation will be described below.

The complementary modules 330 may also include a component 330*e* that performs a permutation that may be relevant to implementing a synthesis filter bank. This type of permutation may be referred to as a synthesis filter bank permutation, and the component 330*e* that implements this permutation may be referred to as a synthesis filter bank permutation component 330*e*. The synthesis filter bank permutation will be described below.

The complementary modules 330 may also include a component 330*f* that performs the DCT-II transform. This component 330*f* may be referred to as a DCT-II transform component 330*f*.

The complementary modules 330 may also include a component 330*g* that performs a permutation that may be relevant to implementing a synthesis filter bank when an MP3 bitstream is being decoded. This type of permutation may be referred to as an MP3 permutation, and the component 330*g* that implements this permutation may be referred to as an MP3 permutation component 330*g*. The MP3 permutation will be described below.

The complementary modules 330 may also include a component 330*h* that performs synthesis polyphase filtering. This component 330*h* may be referred to as a synthesis polyphase filtering component 330*h*. Synthesis polyphase filtering will be described below.

The various functional blocks within the unified filter bank block 324 may be implemented in hardware. Alternatively, these functional blocks may be implemented in a software module executed by a processor. Alternatively still, these functional blocks may be executed by a combination of hardware and software.

Figure 3A:
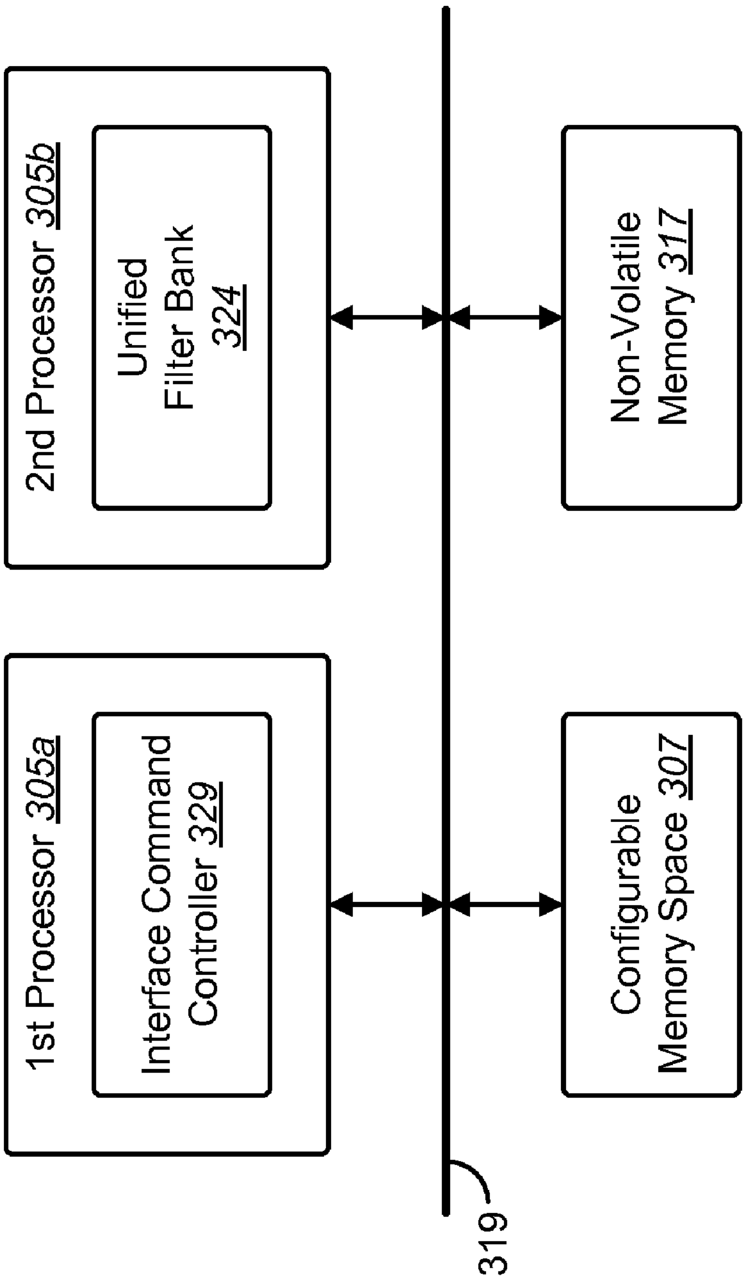
FIG. 3A illustrates one possible implementation of the unified filter bank block and the interface command controller of FIG. 3.

Referring to FIG. 3A, the interface command controller 329 may be implemented by a first processor 305*a*, and the unified filter bank 324 may be implemented by a second processor 305*b*. The first processor 305*a* may be, for example, an ARM, and the second processor 305*b* may be a digital signal processor (DSP). Alternatively, the interface command controller 329 and the unified filter bank 324 may be implemented by a single processor.

A configurable memory space 307 and/or non-volatile memory 317 may be shared between the first processor 305*a* and the second processor 305*b*. The configurable memory space 307 may be similar to the configurable memory space 207 shown in FIGS. 2A and 2B, and the non-volatile memory 317 may be similar to the non-volatile memory 217 shown in FIGS. 2A and 2B.

The first and second processors 305*a-b*, configurable memory space 307, and non-volatile memory 317 may be coupled by one or more buses. A single bus 319 is shown in FIG. 3A.

Several examples will now be described showing how a unified filter bank block (such as the unified filter bank block 324 that is shown in FIG. 3) may be used to perform time-to-frequency and/or frequency-to-time conversion(s) for different types of compressed audio bitstreams. These examples relate to an implementation that is based on the DCT-IV transform. For example, referring to the unified filter bank block 324 of FIG. 3, these examples assume that the reconfigurable transform component 328 is configured to implement the DCT-IV transform. However, other transforms may be used instead of the DCT-IV transform. For example, the DCT-I transform, DCT-II transform, DCT-III transform, DCT-IV transform, FFT, etc., may be used. The description of specific details related to an implementation based on the DCT-IV transform should not be interpreted as limiting the scope of the present disclosure.

The first example relates to performing a frequency-to-time conversion as part of decoding an AAC bitstream. This may involve performing an inverse modified discrete cosine transform (IMDCT transform) followed by an overlap/add operation. This was discussed in a paper titled “Information Technology—Generic coding of moving pictures and associated audio,” published in ISO/IEC JTC1/SC29 WG11 MPEG, International Standard ISO/IEC IS13818-7, Part 7: advanced audio coding (AAC), 1997.

The overlap/add operation may involve multiplying the first half of the IMDCT transform result by the rising part of a synthesis window, multiplying the second half of the IMDCT transform result from the previous frame (i.e., samples that have been delayed by one frame) by the tailing part of the synthesis window, and adding these products together. The second part of the IMDCT transform result from the current frame may be saved for the next frame reconstruction.

Figure 4:
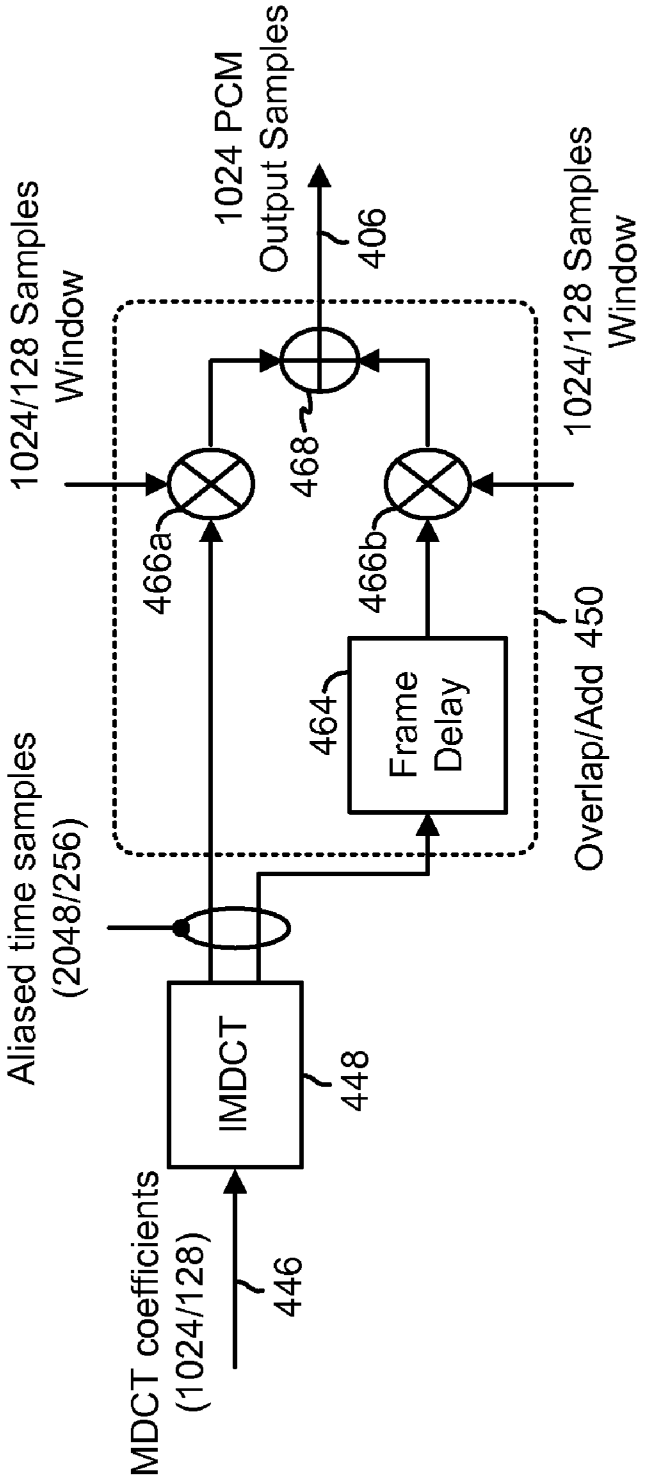
FIG. 4 illustrates one possible approach for frequency-to-time conversion used in decoding of an AAC bitstream.

This approach for the frequency-to-time conversion as part of decoding an AAC bitstream is shown in FIG. 4. Modified discrete cosine transform (MDCT) coefficients 446 are shown being provided to an IMDCT transform component 448. The output of the IMDCT transform component 448 is shown being provided to an overlap/add component 450. More specifically, the output of the IMDCT transform component 448 is shown being provided to a multiplier 466*a*, which multiplies the IMDCT transform result by the rising part of a synthesis window. The output of the IMDCT transform component 448 is also shown being provided to a frame delay component 464, which delays the output of the IMDCT transform component 448 by one frame. The output of the frame delay component 464 is shown being provided to a multiplier 466*b*, which multiplies the delayed output of the IMDCT transform component 448 by the tailing part of a synthesis window. The outputs of the multipliers 466*a*, 466*b* are shown being added together by an adder 468. PCM samples 406 are shown being output from the adder 468.

The IMDCT transform may be implemented by performing the DCT-IV transform, and then performing a permutation that may be referred to as an IMDCT permutation. This was discussed in a paper titled “Signal processing with lapped transforms,” by H. S. Malvar, published in 1992. The DCT-IV transform may be performed in accordance with equation (1):

$$u(n)=\sum_{k=0}^{N-1}X(k)\cos\left\{\frac{\pi}{N}\left(n+\frac{1}{2}\right)\left(k+\frac{1}{2}\right)\right\} \tag{1}$$

where X(k) and u(n) are the DCT-IV input and output respectively, and N is order of the DCT-IV.

Figure 5A:
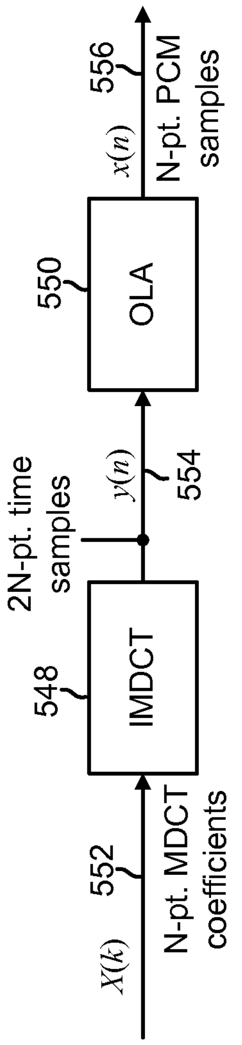
FIGS. 5A through 5D illustrate one possible approach for performing an inverse modified discrete cosine transform (IMDCT) and overlap/add process.
Figure 5B:
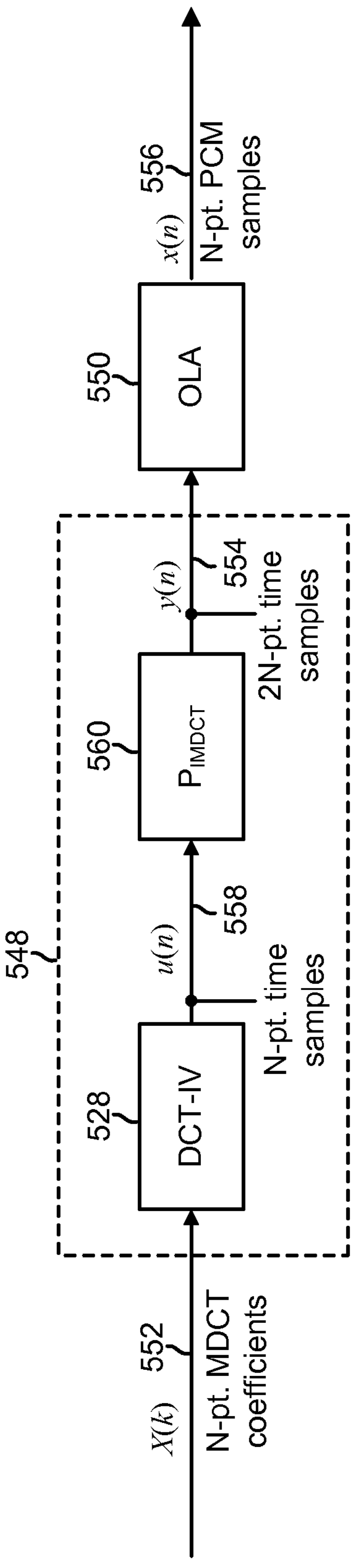
Figure 5C:
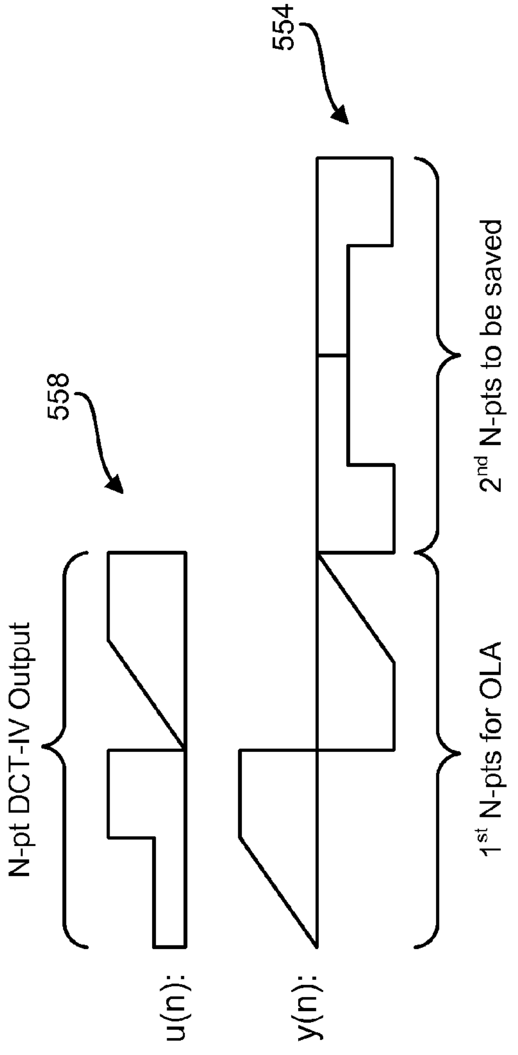

The IMDCT permutation is illustrated in relation to FIGS. 5A through 5C. FIG. 5A shows N-point MDCT coefficients X(k) 552 being provided as input to an IMDCT component 548. The output of the IMDCT component 548 is shown as 2N-point time samples y(n) 554.

The 2N-point time samples y(n) 554 are shown being provided as input to an overlap/add component 550. The output of the overlap/add component 550 is shown as N-point PCM samples x(n) 556.

As indicated above, the IMDCT transform may be implemented by performing a DCT-IV transform followed by the IMDCT permutation. FIG. 5B shows N-point MDCT coefficients X(k) 552 being provided as input to a DCT-IV transform component 528. The output of the DCT-IV transform component 528 is shown as N-point time samples u(n) 558. The N-point time samples u(n) 558 are shown being provided as input to an IMDCT permutation component 560. The output of the IMDCT permutation component 560 is shown as 2N-point time samples y(n) 554. The 2N-point time samples y(n) 554 are shown being provided as input to the overlap/add component 550. The output of the overlap/add component 550 is shown as N-point PCM samples x(n) 556.

FIG. 5C illustrates the IMDCT permutation in greater detail. In particular, FIG. 5C illustrates the relationship between the input to the IMDCT permutation component 560, namely the N-point time samples u(n) 558, and the output of the IMDCT permutation component 560, namely the 2N-point time samples y(n) 554.

The IMDCT permutation and the overlap/add operation may be combined together. This was discussed in 3GPP TS 26.410: "General audio codec audio processing functions; Enhanced aacPlus general audio codec; Floating-point ANSI-C code," published in January 2005. The resulting combination may be referred to as an optimized overlap/add operation. The optimized overlap/add operation may involve converting the N-point time samples u(n) 558 into the N-point PCM samples x(n) 556 without storing the 2N-point time samples y(n) 554. Thus, the optimized overlap/add operation may result in a fifty-percent memory savings compared to the overlap/add operation.

Figure 5D:
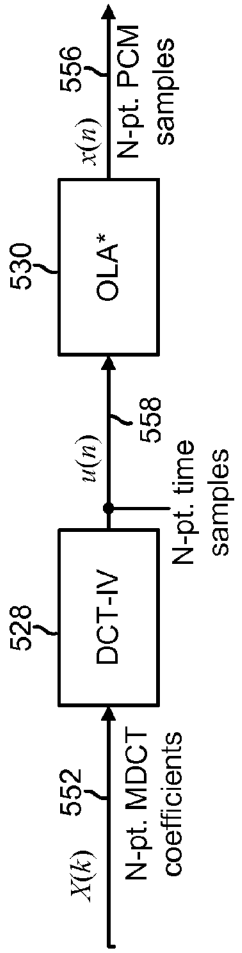

FIG. 5D shows the N-point time samples u(n) 558 output from the DCT-IV transform component 528 being provided to a component 530 that performs the optimized overlap/add operation. The N-point PCM samples x(n) 556 are shown being output from the optimized overlap/add component 530.

Figure 6:
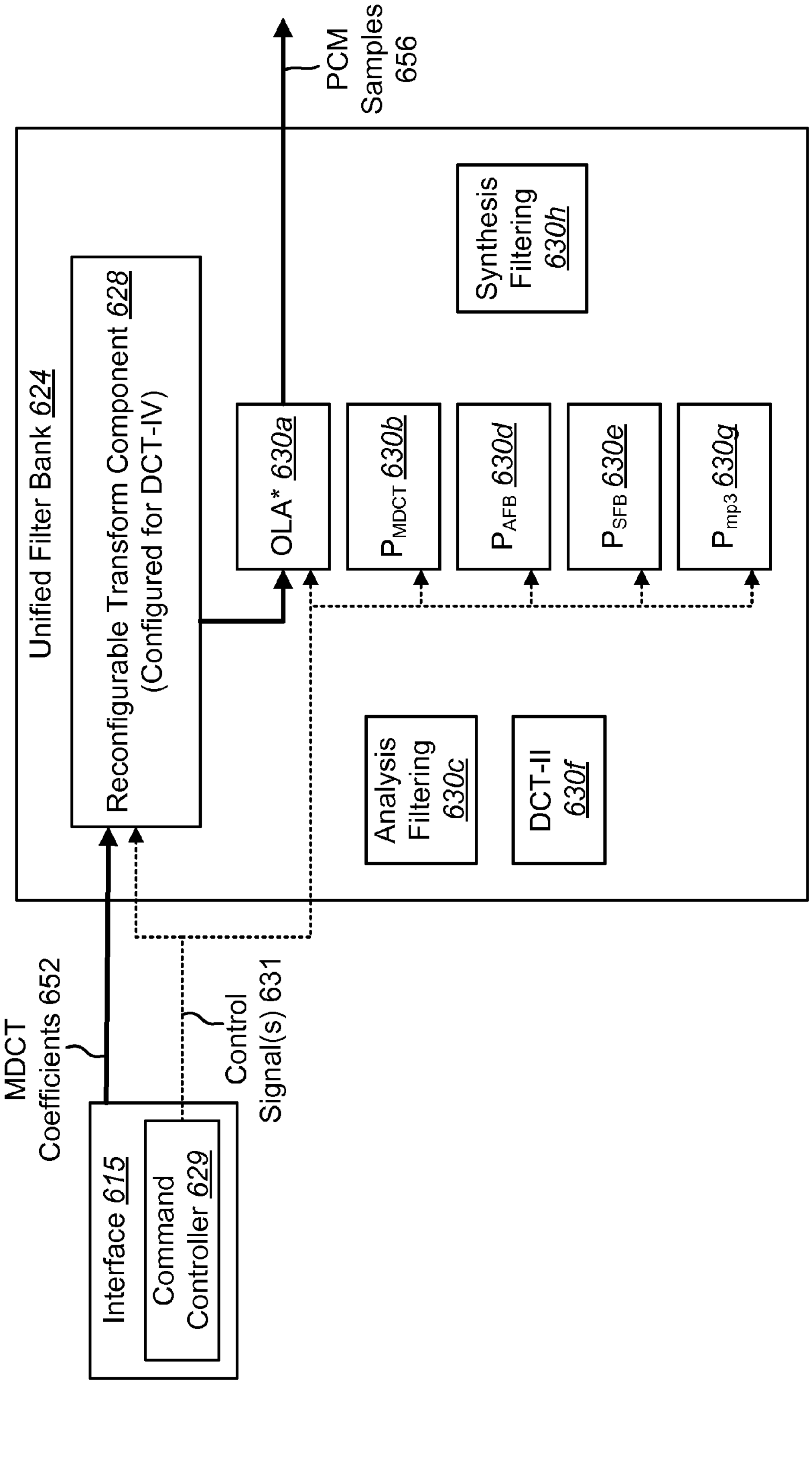
FIG. 6 illustrates one possible way that frequency-to-time conversion may be implemented by a unified filter bank block when an AAC bitstream is being decoded.

FIG. 6 illustrates one possible way that frequency-to-time and/or time-to-frequency conversion(s) used in various decoders may be implemented by a unified filter bank block 624. The unified filter bank block 624 is similar to the unified filter bank block 324 of FIG. 3. The unified filter bank block 624 is shown with a reconfigurable transform component 628, an optimized overlap/add component 630*a*, an MDCT permutation component 630*b*, an analysis polyphase filtering component 630*c*, an analysis filter bank permutation component 630*d*, a synthesis filter bank permutation component 630*e*, a DCT-II transform component 630*f*, an MP3 permutation component 630*g*, and a synthesis polyphase filtering component 630*h*.

As discussed above, performing the frequency-to-time conversion for an AAC bitstream may involve performing the IMDCT transform followed by performing an overlap/add operation. This may be accomplished by performing the DCT-IV transform and then performing an optimized overlap/add operation. An example showing how the unified filter bank block 624 may be used to perform these operations will now be described.

An interface command controller 629 may send control signal(s) 631 to the reconfigurable transform component 628. The control signals 631 are shown in dotted lines in FIG. 6. The control signal(s) 631 may cause the reconfigurable transform component 628 to become configured to implement the DCT-IV transform.

The interface command controller 629 may also send control signal(s) 631 to the optimized overlap/add component 630*a*, the MDCT permutation component 630*b*, the analysis filter bank permutation component 630*d*, the synthesis filter bank permutation component 630*e*, and the MP3 permutation component 630*g*. The control signal(s) 631 may cause these complementary modules 630*a*, 630*b*, 630*d*, 630*e*, 630*g* to become configured to implement permutations that depend on the specific transform that is being implemented by the reconfigurable transform component 628 (e.g., the DCT-IV transform). The control signals 631 may also cause the execution of the components in a specific order. The data path connections, and the order in which the execution of the components occurs, will be described in greater detail immediately below.

MDCT coefficients 652 may be provided as input to the reconfigurable transform component 628 (which, as indicated above, may be configured for the DCT-IV transform). The MDCT coefficients 652 may be received via an interface 615. The MDCT coefficients 652 may be sent to the unified filter bank block 624, or fetched by the unified filter bank block 624. The interface 615 may be the interface 115 in the audio playback system 100 of FIG. 1. The reconfigurable transform component 628 may perform the DCT-IV transform as described above. The output of the reconfigurable transform component 628 is shown being provided to the optimized overlap/add component 630*a*. The optimized overlap/add component 630*a* may perform the optimized overlap/add operation as described above. PCM samples 656 are shown being output from the optimized overlap/add component 630*a*.

Figure 7:
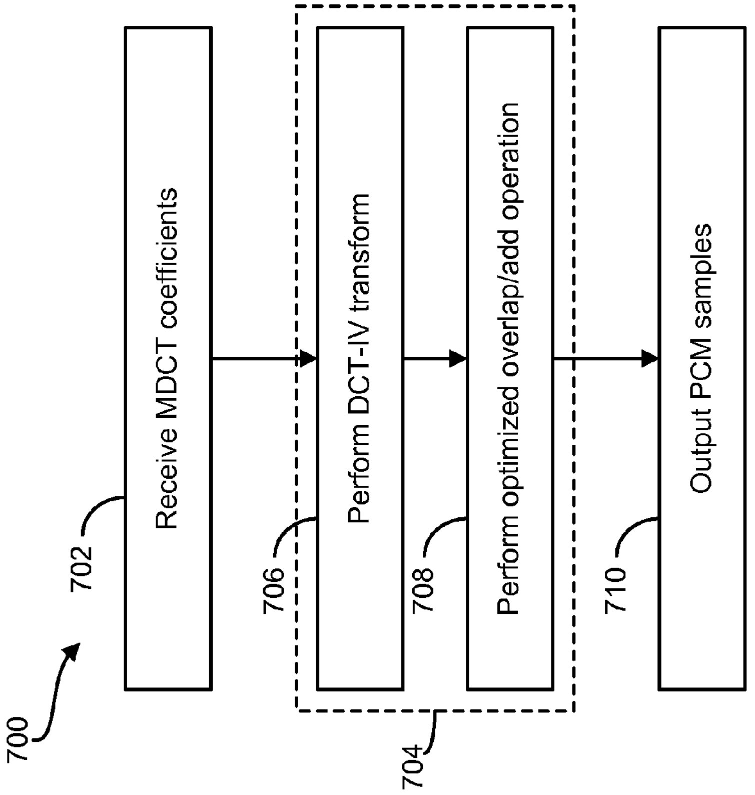
FIG. 7 illustrates a method for frequency-to-time conversion when an AAC bitstream is being decoded.

FIG. 7 illustrates a method 700 for frequency-to-time conversion when an AAC bitstream is being decoded. The method 700 may be implemented by a unified filter bank block 624.

The method 700 may include receiving 702 MDCT coefficients 652 and performing 704 the IMDCT transform and an overlap/add operation. As discussed above, performing 704 the IMDCT transform and the overlap/add operation may be accomplished by performing 706 the DCT-IV transform and performing 708 an optimized overlap/add operation. The method 700 may also include outputting 710 PCM samples 656.

Figure 8:
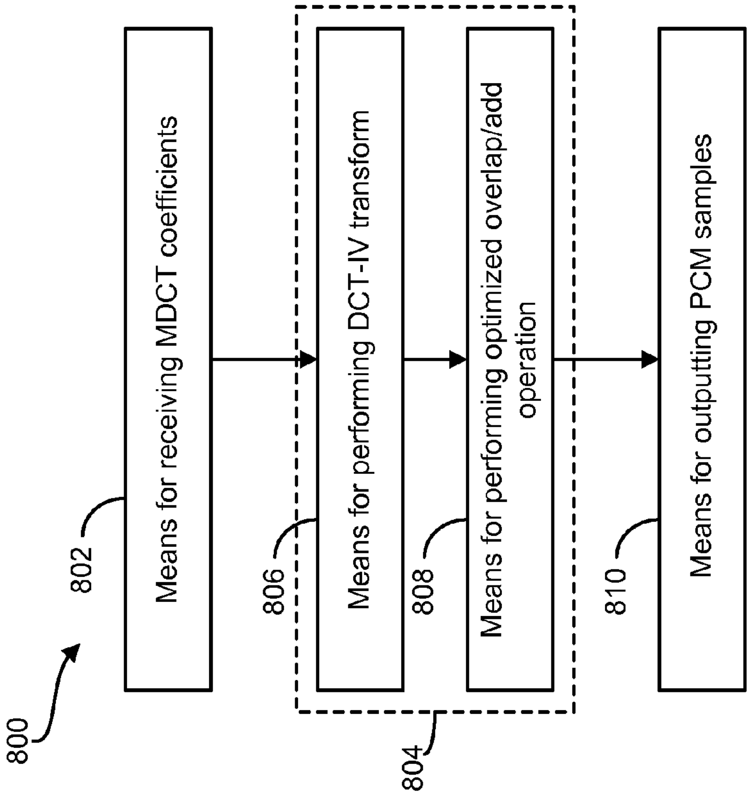
FIG. 8 illustrates means-plus-function blocks corresponding to the method shown in FIG. 7.

The method 700 of FIG. 7 described above may be performed by various hardware and/or software component(s) and/or module(s) corresponding to the means-plus-function blocks 800 illustrated in FIG. 8. In other words, blocks 702 through 710 illustrated in FIG. 7 correspond to means-plus-function blocks 802 through 810 illustrated in FIG. 8.

The next example relates to performing a frequency-to-time conversion as part of decoding an MP3 bitstream. This may involve performing the IMDCT, performing the overlap/add operation, and then implementing a synthesis filter bank. This was discussed in ISO/IEC JTC1/SC29 WG11 MPEG, International Standard ISO/IEC IS13818-3, "Information technology—Generic coding of moving pictures and associated audio," Part 3: Audio, published in 1994.

Figure 9:
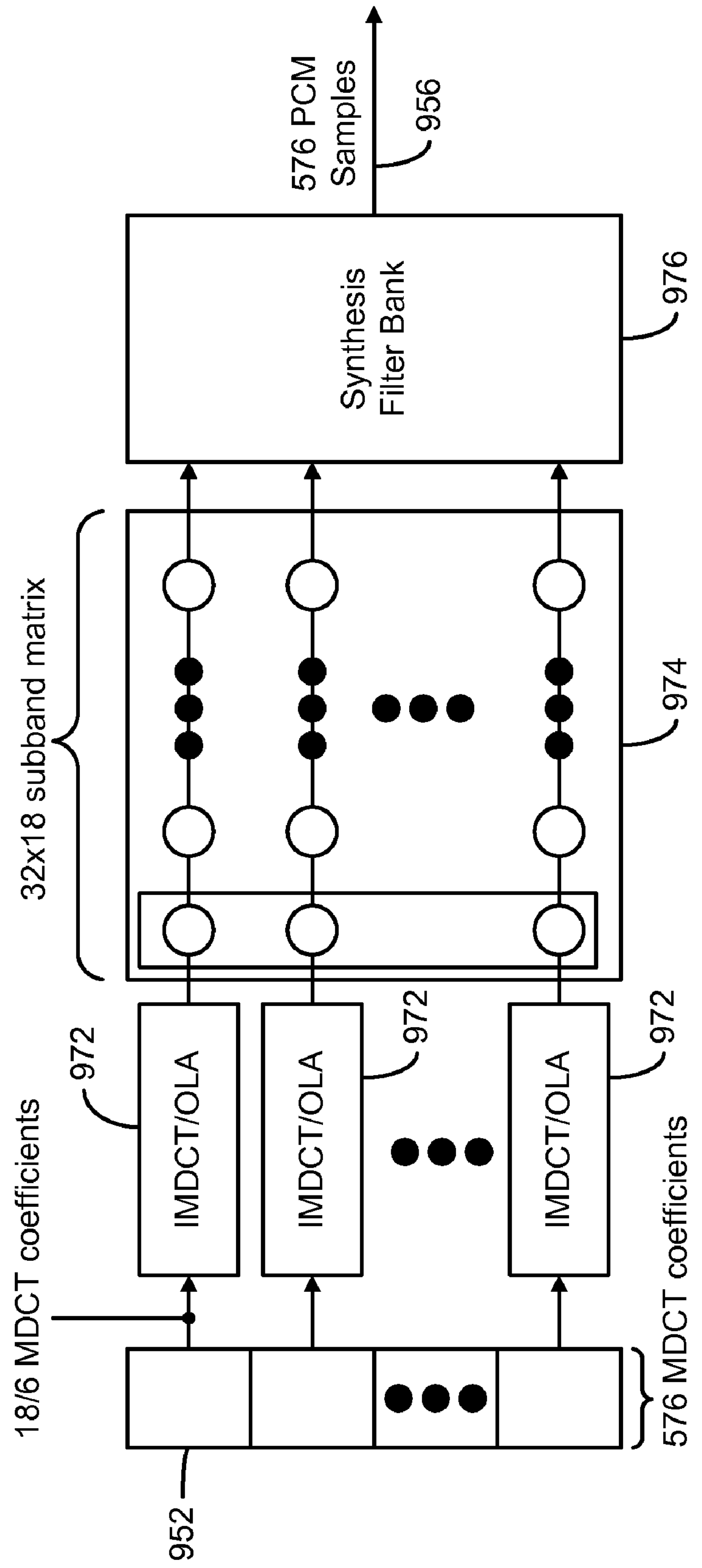
FIG. 9 illustrates one possible approach for frequency-to-time conversion as part of decoding an MP3 bitstream.

This approach for frequency-to-time conversion as part of decoding an MP3 bitstream is shown in FIG. 9. MDCT coefficients 952 are shown being provided as input to IMDCT/OLA (overlap/add) components 972. The IMDCT/OLA components 972 are shown outputting a subband matrix 974. A synthesis filter bank 976 may convert the subband matrix 974 to PCM samples 956.

One possible implementation of the synthesis filter bank 976 will now be described. Implementing the synthesis filter bank 976 may involve performing a buffer shifting operation, which may be represented by the following pseudo code:

```
for (i=1023; i<64; i--)
    V[i]=V[i-64];
```

Implementing the synthesis filter bank 976 may also involve performing a matrix operation for subband samples $S_k$, which may be represented by the following pseudo code:

for $(i = 0; i < 64; i{+}{+})$ $$V[i] = \sum_{k=0}^{31} S_k \cos\left\{\frac{\pi}{32}\left(k+\frac{1}{2}\right)(i+16)\right\}$$

This matrix operation may be implemented by performing the DCT-II transform and then performing a permutation that may be referred to as an MP3 permutation. This was discussed in an article titled "Fast subband filtering in MPEG audio coding," by K. Konstantinides, published in the IEEE Signal Processing Letter, vol. 1, pp. 26-28, 1994. The DCT-II transform may be performed in accordance with equation (2) below, and the permutation may be performed in accordance with equation (3) below.

$$V'[i] = \sum_{k=0}^{31} S_k \cos\left\{\frac{\pi}{32}\left(k+\frac{1}{2}\right)i\right\}, \tag{2}$$

$$V[i] = \begin{cases} V'[16+i], & 0 \le n < 16 \\ -V'[47-i], & 16 \le n < 48 \\ -V'[i-48], & 48 \le n < 64 \end{cases} \tag{3}$$

Figure 10:
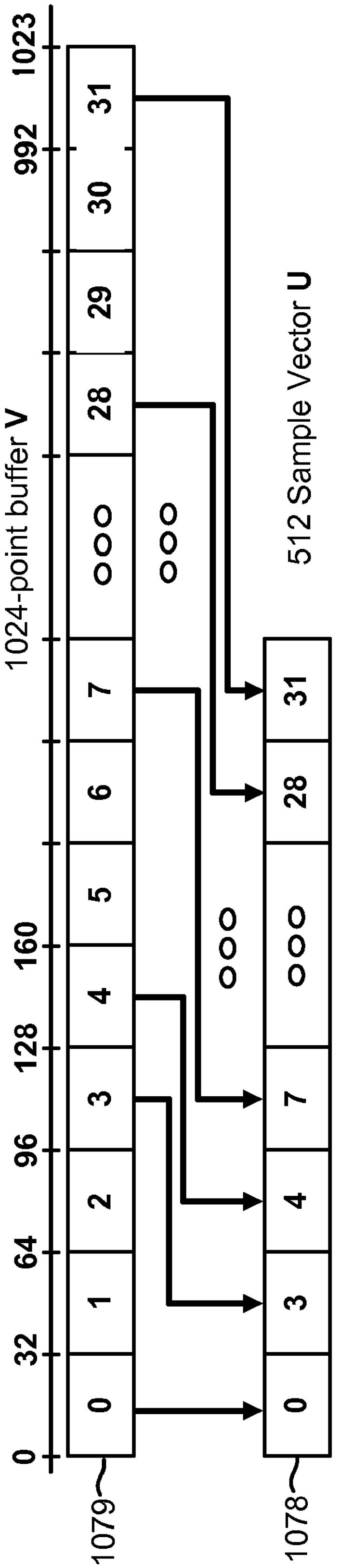
FIG. 10 illustrates one aspect of synthesis polyphase filtering as part of decoding an MP3 bitstream.

Implementing the synthesis filter bank 976 may also involve performing synthesis polyphase filtering. Synthesis polyphase filtering may involve building a samples vector U 1078 from the given samples buffer V 1079 as shown in FIG. 10, and then performing a windowing operation by prototype low-pass filter coefficients W and a sample calculation operation to output a 32 PCM samples vector S. The windowing operation and the sample calculation operation may be represented by the following pseudo code:

for $(i = 0; i < 512; i{+}{+})$ $U[i] = V[i] * W[i]$ for $(j = 0; j < 32; j{+}{+})$ $$S[j] = \sum_{i=0}^{15} U[j + 32 * i]$$

Figure 11:
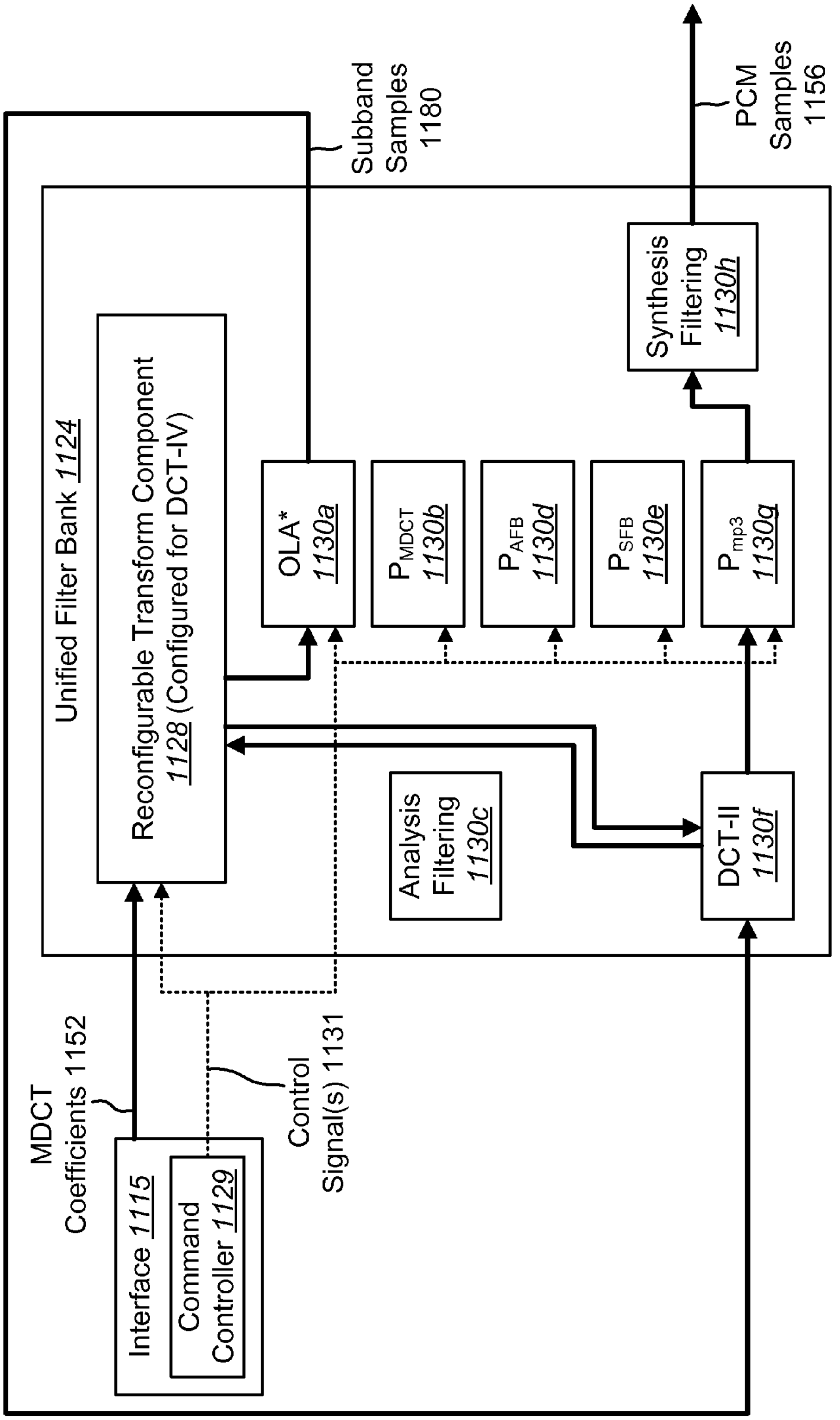
FIG. 11 illustrates one possible way that frequency-to-time conversion may be implemented by a unified filter bank block when an MP3 bitstream is being decoded.

FIG. 11 illustrates one possible way that frequency-to-time conversion may be implemented by a unified filter bank block 1124 when an MP3 bitstream is being decoded. The unified filter bank block 1124 is similar to the unified filter bank block 324 of FIG. 3. The unified filter bank block 1124 is shown with a reconfigurable transform component 1128, an optimized overlap/add component 1130*a*, an MDCT permutation component 1130*b*, an analysis polyphase filtering component 1130*c*, an analysis filter bank permutation component 1130*d*, a synthesis filter bank permutation component 1130*e*, a DCT-II component 1130*f*, an MP3 permutation component 1130*g*, and a synthesis polyphase filtering component 1130*h*.

As discussed above, performing the frequency-to-subband and then subband-to-time conversions for an MP3 bitstream may involve performing the IMDCT followed by performing an overlap/add operation. This may be accomplished by performing a DCT-IV transform and then performing an optimized overlap/add operation. An example showing how the unified filter bank block 1124 may be used to perform these operations will now be described.

An interface command controller 1129 may send control signal(s) 1131 to the reconfigurable transform component 1128. The control signals 1131 are shown in dotted lines in FIG. 11. The control signal(s) 1131 may cause the reconfigurable transform component 1128 to become configured to implement the DCT-IV.

The interface command controller 1129 may also send control signal(s) 1131 to the optimized overlap/add component 1130*a*, the MDCT permutation component 1130*b*, the analysis filter bank permutation component 1130*d*, the synthesis filter bank permutation component 1130*e*, and the MP3 permutation component 1130*g*. The control signal(s) 1131 may cause these complementary modules 1130*a*, 1130*b*, 1130*d*, 1130*e*, 1130*g* to become configured to implement permutations that depend on the DCT-IV. The control signals 1131 may also cause appropriate data path connections to be established between the various components. The control signals 1131 may also cause the execution of the components in a specific order. The data path connections, and the order in which the execution of the components occurs, will be described in greater detail immediately below.

MDCT coefficients 1152 may be provided as input to the reconfigurable transform component 1128 (which, as indicated above, may be configured for the DCT-IV). The MDCT coefficients 1152 may be received via an interface 1115. The MDCT coefficients 1152 may be sent to the unified filter bank block 1124, or fetched by the unified filter bank block 1124. The interface 1115 may be the interface 115 in the audio playback system 100 of FIG. 1. The reconfigurable transform component 1128 may perform the DCT-IV transform as described above. The output of the reconfigurable transform component 1128 is shown being provided to the optimized overlap/add component 1130*a*. The optimized overlap/add component 1130*a* may perform the optimized overlap/add operation as described above. Subband samples 1180 are shown being output from the optimized overlap/add component 1130*a*. The subband samples 1180 may then be fed back as input to a synthesis filter bank.

As discussed above, implementing a synthesis filter bank may involve performing a matrix operation that may be implemented by the DCT-II transform and a permutation that may be referred to as an MP3 permutation. Thus, the subband samples 1180 may be fed back as input to the DCT-II transform component 1130*f*. The DCT-II transform component 1130*f* may perform the DCT-II transform with respect to the subband samples 1180, as described above. The DCT-II transform may be performed in accordance with equation (2) above. As shown in FIG. 11, the DCT-II transform component 1130*f* may utilize the reconfigurable transform component 1128 (which, as indicated above, may be configured for the DCT-IV transform) to efficiently perform the DCT-II transform.

The output of the DCT-II transform component 1130*f* is shown being provided to the MP3 permutation component 1130*g*. The MP3 permutation component 1130*g* may perform the MP3 permutation, as described above. The MP3 permutation may be performed in accordance with equation (3) above.

As discussed above, implementing the synthesis filter bank may also involve performing synthesis polyphase filtering. Thus, the output of the MP3 permutation component 1130*g* is shown being provided to the synthesis polyphase filtering component 1130*h*. Synthesis polyphase filtering may be performed as described above. PCM samples 1156 are shown being output from the synthesis polyphase filtering component 1130*h*.

Figure 12:
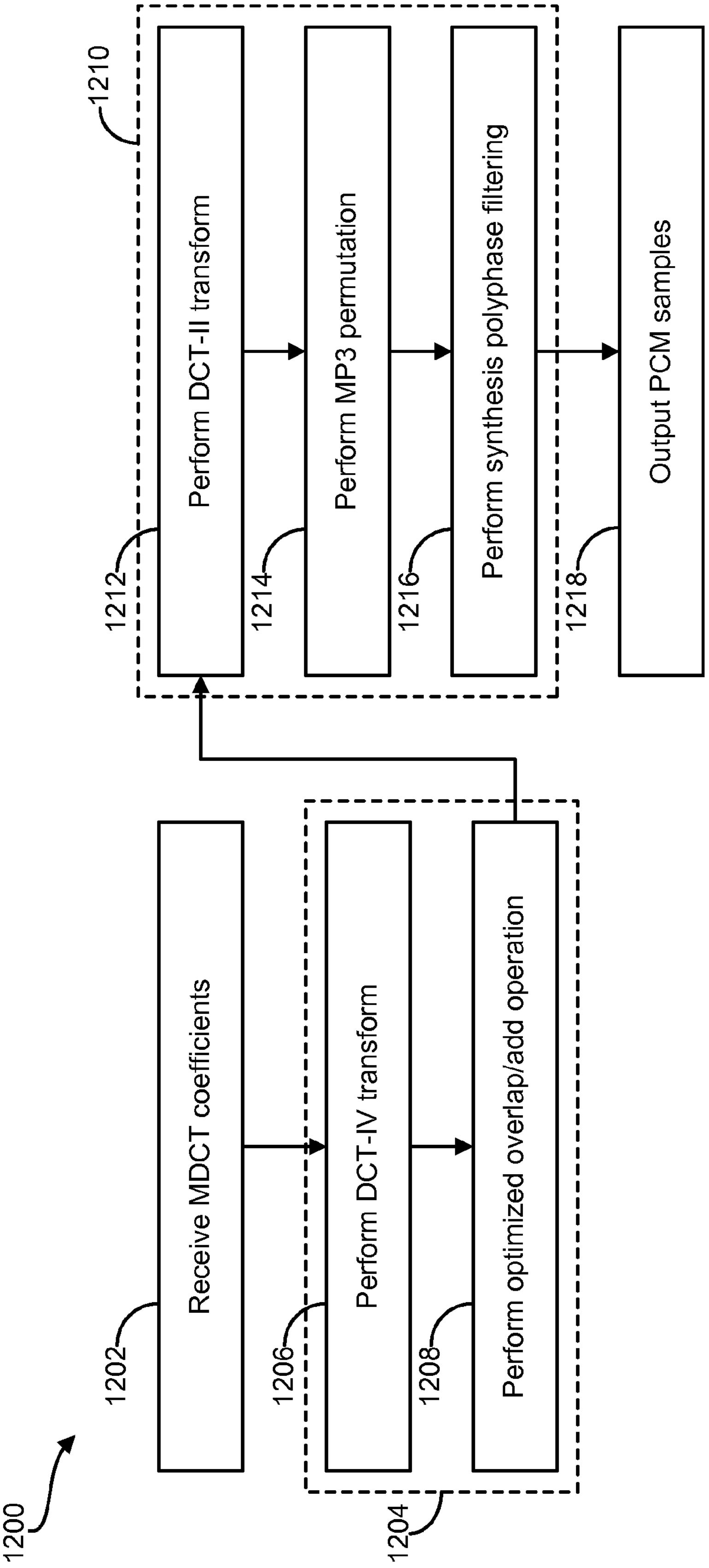
FIG. 12 illustrates a method for frequency-to-time conversion when an MP3 bitstream is being decoded.

FIG. 12 illustrates a method 1200 for frequency-to-time conversion when an MP3 bitstream is being decoded. The method 1200 may be implemented by a unified filter bank block 1124.

The method 1200 may include receiving 1202 MDCT coefficients 1152 and performing 1204 the IMDCT and an overlap/add operation. As discussed above, performing 1204 the IMDCT and the overlap/add operation may be accomplished by performing 1206 the DCT-IV transform and performing 1208 an optimized overlap/add operation.

The method 1200 may also include implementing 1210 a synthesis filter bank 976. Implementing 1210 the synthesis filter bank 976 may also involve performing a matrix operation, which may be implemented by performing 1212 the DCT-II transform and then performing 1214 a permutation that may be referred to as an MP3 permutation. Implementing 1210 the synthesis filter bank 976 may also involve performing 1216 synthesis polyphase filtering. The method 1200 may also include outputting 1218 PCM samples 1156.

Figure 13:
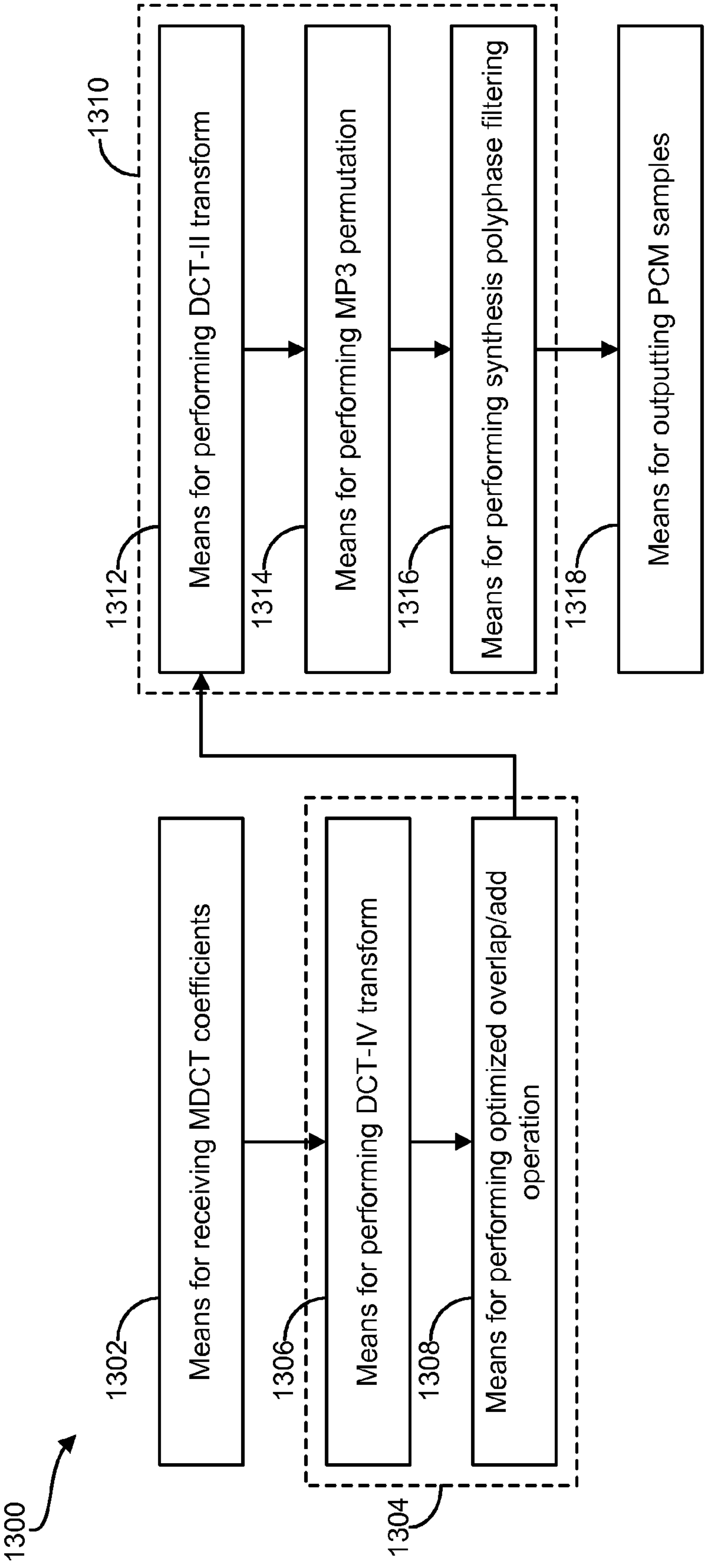
FIG. 13 illustrates means-plus-function blocks corresponding to the method shown in FIG. 12.

The method 1200 of FIG. 12 described above may be performed by various hardware and/or software component(s) and/or module(s) corresponding to the means-plus-function blocks 1300 illustrated in FIG. 13. In other words, blocks 1202 through 1218 illustrated in FIG. 12 correspond to means-plus-function blocks 1302 through 1318 illustrated in FIG. 13.

The next example relates to performing frequency-to-time and time-to-frequency conversions as part of decoding an HE-AAC or an HE-AAC v2 bitstream. In this discussion, the term "HE-AAC type bitstream" refers to either an HE-AAC bitstream or an HE-AAC v2 bitstream.

Figure 14:
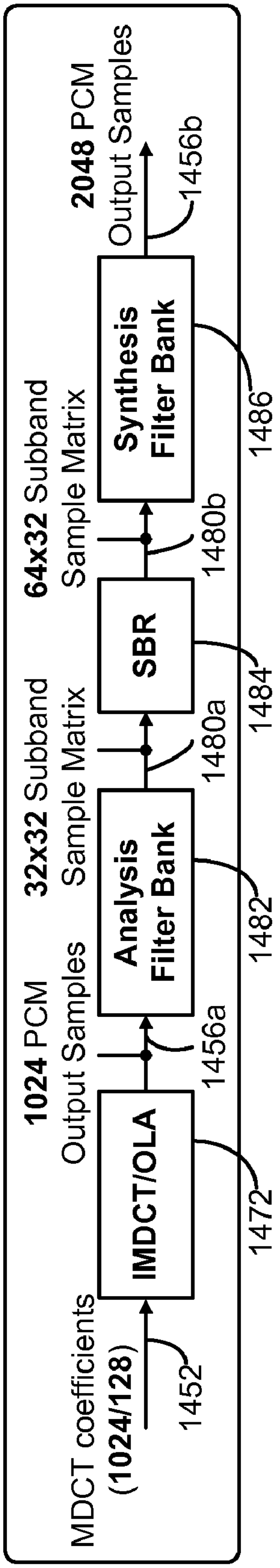
FIG. 14 illustrates one possible approach for frequency-to-time and time-to-frequency conversions as part of decoding an HE-AAC or an HE-AAC v2 bitstream.

Performing frequency-to-time and time-to-frequency conversions as part of decoding an HE-AAC type bitstream may involve performing the IMDCT, performing the overlap/add operation, implementing an analysis filter bank, and implementing a synthesis filter bank. This was discussed in ISO/IEC JTC1/SC29 WG11 MPEG, "Text of ISO/IEC 14496-3: 2001/AMD 1:2003, bandwidth extension," published in November 2003. Referring to FIG. 14, MDCT coefficients 1452 are shown being provided as input to an IMDCT/OLA (overlap/add) component 1472. The IMDCT/OLA component 1472 is shown outputting PCM samples 1456*a*.

The PCM samples 1456*a* are shown being provided as input to an analysis filter bank component 1482. The analysis filter bank component 1482 is shown outputting a subband matrix 1480*a*.

The subband matrix 1480*a* is shown being processed by a spectral band replication component 1484. The spectral band replication component 1484 is shown outputting a subband matrix 1480*b*.

The subband matrix 1480*b* is shown being provided as input to a synthesis filter bank component 1486. The synthesis filter bank component 1486 is shown outputting PCM samples 1456*b*.

One possible implementation of the analysis filter bank may comprise analysis buffer shifting, analysis polyphase filtering, and a matrix operation. Analysis buffer shifting may involve making room for new samples, and adding new samples in the reverse order. This may be done in accordance with equations (4) and (5) below:

$$x[n+32]=x[n] \text{ for } n=0 \text{ to } 319\text{-}32 \quad (4)$$

$$x[31-n]=(\text{next sample}) \text{ for } n=0 \text{ to } 31 \quad (5)$$

Analysis polyphase filtering may involve applying a windowing operation by prototype low-pass filter coefficients to the samples stored in the analysis buffer, and performing a partial sum. This may be done in accordance with equations (6) and (7) below:

$$Z[n]=x[n]*C[n] \quad \text{for } n=0 \text{ to } 319 \quad (6)$$

$$U[n]=\sum_{m=0}^{4} Z[n+m*64] \quad \text{for } n=0 \text{ to } 63 \quad (7)$$

Implementing the analysis filter bank may then be accomplished by performing a matrix operation, which may be represented by equation (8) below:

$$X[k]=\sum_{n=0}^{63} U[n]\exp\left\{j\frac{\pi}{64}\left(k+\frac{1}{2}\right)\left(2n-\frac{1}{2}\right)\right\} \quad \text{for } k=0 \text{ to } 63 \quad (8)$$

The matrix operation may be implemented by performing a permutation, which may be referred to as an analysis filter bank permutation, and then performing a DCT-IV transform. The analysis filter bank permutation may be performed in accordance with equations (9), (10), and (11) below:

$$U'(n)=U(63-n), \quad (9)$$

$$\upsilon(2n)=\begin{cases} U'(0), & n=0 \\ -U'(64-n), & n=1, \ldots, 30 \\ -U'(33), & n=31 \end{cases} \quad (10)$$

$$\upsilon(2n+1)=\begin{cases} U'(1), & n=0 \\ U'(n+1), & n=1, \ldots, 30 \\ U'(32), & n=31 \end{cases} \quad (11)$$

The DCT-IV transform may be performed in accordance with equation (12) below. The subband samples shown in equation (8) may be obtained by equation (13).

$$V(k)=\sum_{n=0}^{63} \upsilon(n)\cos\left\{\frac{\pi}{64}\left(n+\frac{1}{2}\right)\left(k+\frac{1}{2}\right)\right\}, \quad (12)$$

$$X(k)=V(k)-jV(63-k) \quad (13)$$

The synthesis filter bank may be implemented similarly to the synthesis filter bank that was described above in reference to decoding an MP3 bitstream. As described above, implementing the synthesis filter bank may involve a matrix operation followed by synthesis polyphase filtering. However, certain differences may exist between the synthesis filter bank implementation for an MP3 bitstream and the synthesis filter bank implementation for an HE-AAC type bitstream. For example, for an HE-AAC type bitstream the buffer size may be 1280 (it may be 1024 for an MP3 bitstream), the polyphase filter order may be 640 (it may be 512 for an MP3 bitstream), and 64×32 PCM samples may be output (for an MP3 bitstream, 32×18 PCM samples may be output).

Also, the synthesis filter bank implementation for an HE-AAC type bitstream may utilize a different matrix operation than the synthesis filter bank implementation for an MP3 bitstream. The matrix operation for an HE-AAC type bitstream may be represented by equation (14) below:

$$\text{For } n = 0, 1, \ldots, 127, \quad x(n) = \sum_{k=0}^{63} \mathrm{Re}\left\{X(k)\exp\left\{j\frac{\pi}{128}(2n-255)\left(k+\frac{1}{2}\right)\right\}\right\} \tag{14}$$

The matrix operation corresponding to equation (14) may be implemented as two DCT-IV transforms followed by a permutation, which may be referred to as a synthesis filter bank permutation. The DCT-IV transforms may be represented by equations (15) and (16):

$$\text{For } n = 0, 1, \ldots, 63, \quad u_r(n) = \sum_{k=0}^{63} \mathrm{Re}\{X(k)\}\cos\left\{\frac{\pi}{64}\left(n+\frac{1}{2}\right)\left(k+\frac{1}{2}\right)\right\} \tag{15}$$

$$u_i(n) = \sum_{k=0}^{63} \mathrm{Im}\{X(k)\}\cos\left\{\frac{\pi}{64}\left(n+\frac{1}{2}\right)\left(k+\frac{1}{2}\right)\right\} \tag{16}$$

The synthesis filter bank permutation may be represented by equation (17):

$$\text{For } n=0, 1, \ldots, 63,$$
$$x(n)=(-1)^n u_i(n)-u_r(n)$$
$$x(127-n)=(-1)^n u_i(n)+u_r(n) \tag{17}$$

Figure 15:
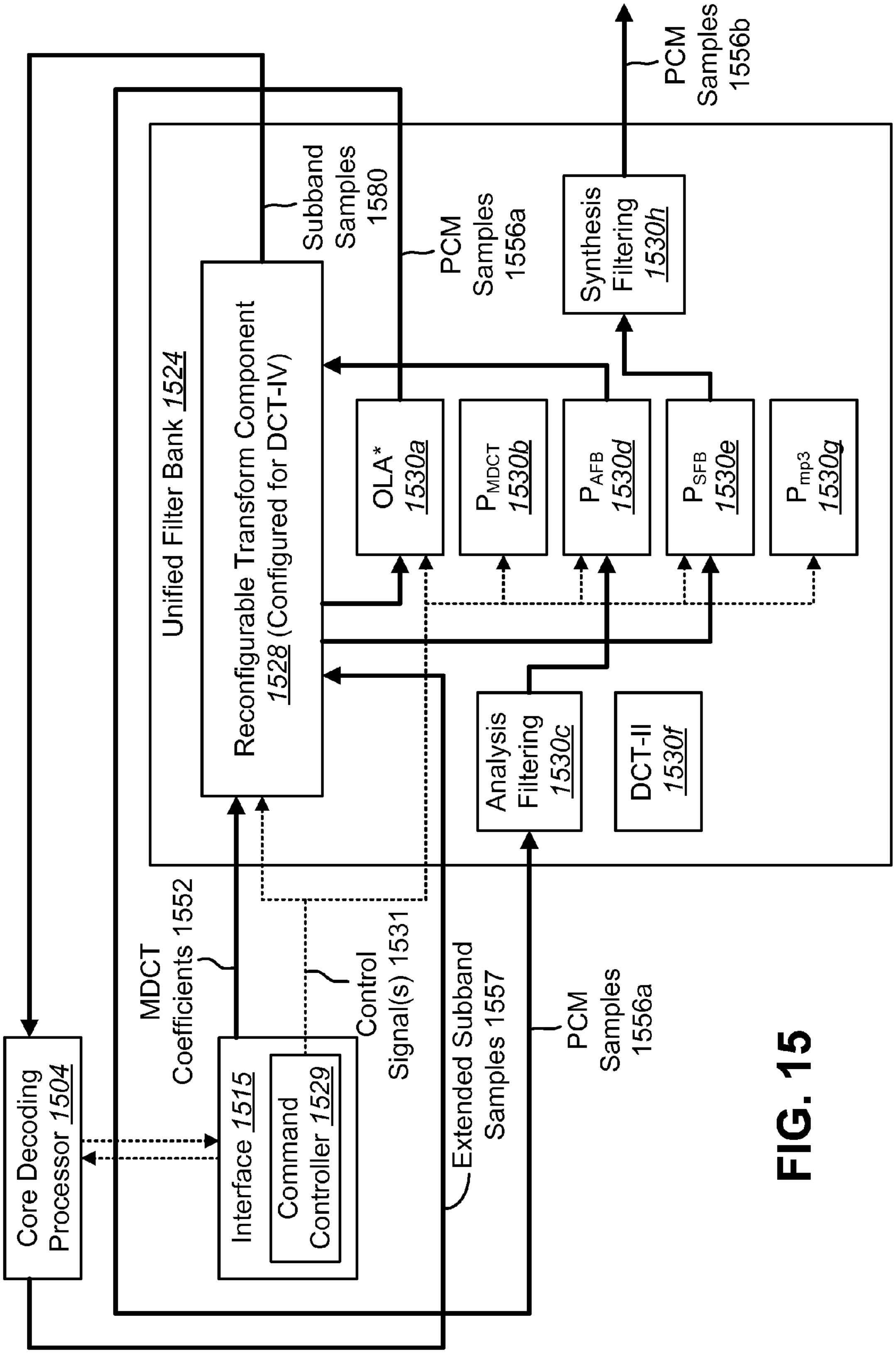
FIG. 15 illustrates one possible way that frequency-to-time and time-to-frequency conversions may be implemented by a unified filter bank block when an HE-AAC or an HE-AAC v2 bitstream is being decoded.

FIG. 15 illustrates one possible way that the frequency-to-time and time-to-frequency conversions may be implemented by a unified filter bank block 1524 when an HE-AAC type bitstream is being decoded. The unified filter bank block 1524 is similar to the unified filter bank block 324 of FIG. 3. The unified filter bank block 1524 is shown with a reconfigurable transform component 1528, an optimized overlap/add component 1530*a*, an MDCT permutation component 1530*b*, an analysis polyphase filtering component 1530*c*, an analysis filter bank permutation component 1530*d*, a synthesis filter bank permutation component 1530*e*, a DCT-II transform component 1530*f*, an MP3 permutation component 1530*g*, and a synthesis polyphase filtering component 1530*h*.

As discussed above, performing frequency-to-time and time-to-frequency conversions for an HE-AAC type bitstream may involve performing the IMDCT followed by performing an overlap/add operation. This may be accomplished by performing a DCT-IV transform and then performing an optimized overlap/add operation. Performing frequency-to-time and time-to-frequency conversions for an HE-AAC type bitstream may also involve implementing an analysis filter bank. This may be accomplished by performing analysis polyphase filtering, followed by an analysis filter bank permutation, followed by a DCT-IV transform. Performing frequency-to-time and time-to-frequency conversions for an HE-AAC type bitstream may also involve implementing a synthesis filter bank. As discussed above, this may be accomplished by performing two DCT-IV transforms, followed by a synthesis filter bank permutation, followed by synthesis polyphase filtering. An example showing how the unified filter bank block 1524 may be used to perform these operations will now be described.

An interface command controller 1529 may send control signal(s) 1531 to the reconfigurable transform component 1528. The control signals 1531 are shown in dotted lines in FIG. 15. The control signal(s) 1531 may cause the reconfigurable transform component 1528 to become configured to implement the DCT-IV.

The interface command controller 1529 may also send control signal(s) 1531 to the optimized overlap/add component 1530*a*, the MDCT permutation component 1530*b*, the analysis filter bank permutation component 1530*d*, the synthesis filter bank permutation component 1530*e*, and the MP3 permutation component 1530*g*. The control signal(s) 1531 may cause these complementary modules 1530*a*, 1530*b*, 1530*d*, 1530*e*, 1530*g* to become configured to implement permutations that depend on the DCT-IV. The control signals 1531 may also cause appropriate data path connections to be established between the various components. The control signals 1531 may also cause the execution of the components in a specific order. The data path connections, and the order in which the execution of the components occurs, will be described in greater detail immediately below.

MDCT coefficients 1552 may be provided as input to the reconfigurable transform component 1528 (which, as indicated above, may be configured for the DCT-IV). The MDCT coefficients 1552 may be received via an interface 1515. The MDCT coefficients 1552 may be sent to the unified filter bank block 1524, or fetched by the unified filter bank block 1524. The interface 1515 may be the interface 115 in the audio playback system 100 of FIG. 1. The reconfigurable transform component 1528 may perform the DCT-IV transform as described above. The output of the reconfigurable transform component 1528 is shown being provided to the optimized overlap/add component 1530*a*. The optimized overlap/add component 1530*a* may perform the optimized overlap/add operation as described above. PCM samples 1556*a* are shown being output from the optimized overlap/add component 1530*a*.

The PCM samples 1556*a* output from the optimized overlap/add component 1530*a* may be fed back and provided as input to the analysis polyphase filtering component 1530*c*. The output of the analysis polyphase filtering component 1530*c* is shown being provided as input to the analysis filter bank permutation component 1530*d*, and the output of the analysis filter bank permutation component 1530*d* is shown being provided as input to the reconfigurable transform component 1528 (which, as indicated above, may be configured for the DCT-IV). Subband samples 1580 are shown being output from the reconfigurable transform component 1528.

The subband samples 1580 output from the reconfigurable transform component 1528 may be fed back to the core decoding processor 1504 that performs the spectral band replication to produce extended subband samples 1557. These extended subband samples 1557 may be provided as input to the unified filter bank block 1524. The core decoding processor 1504 may also send a command to make the connections required in the unified filter bank block 1524 to perform the required operations for the synthesis filter bank. The command may make the input to the unified filter bank block 1524 as the input to the reconfigurable transform component 1528. The output of the reconfigurable transform component 1528 may be provided as input to the synthesis filter bank permutation component 1530*e*. The output of the synthesis filter bank permutation component 1530*e* is shown being provided as input to the synthesis polyphase filtering component 1530*h*. PCM samples 1556*b* are shown being output by the synthesis polyphase filtering component 1530*h*.

Figure 16:
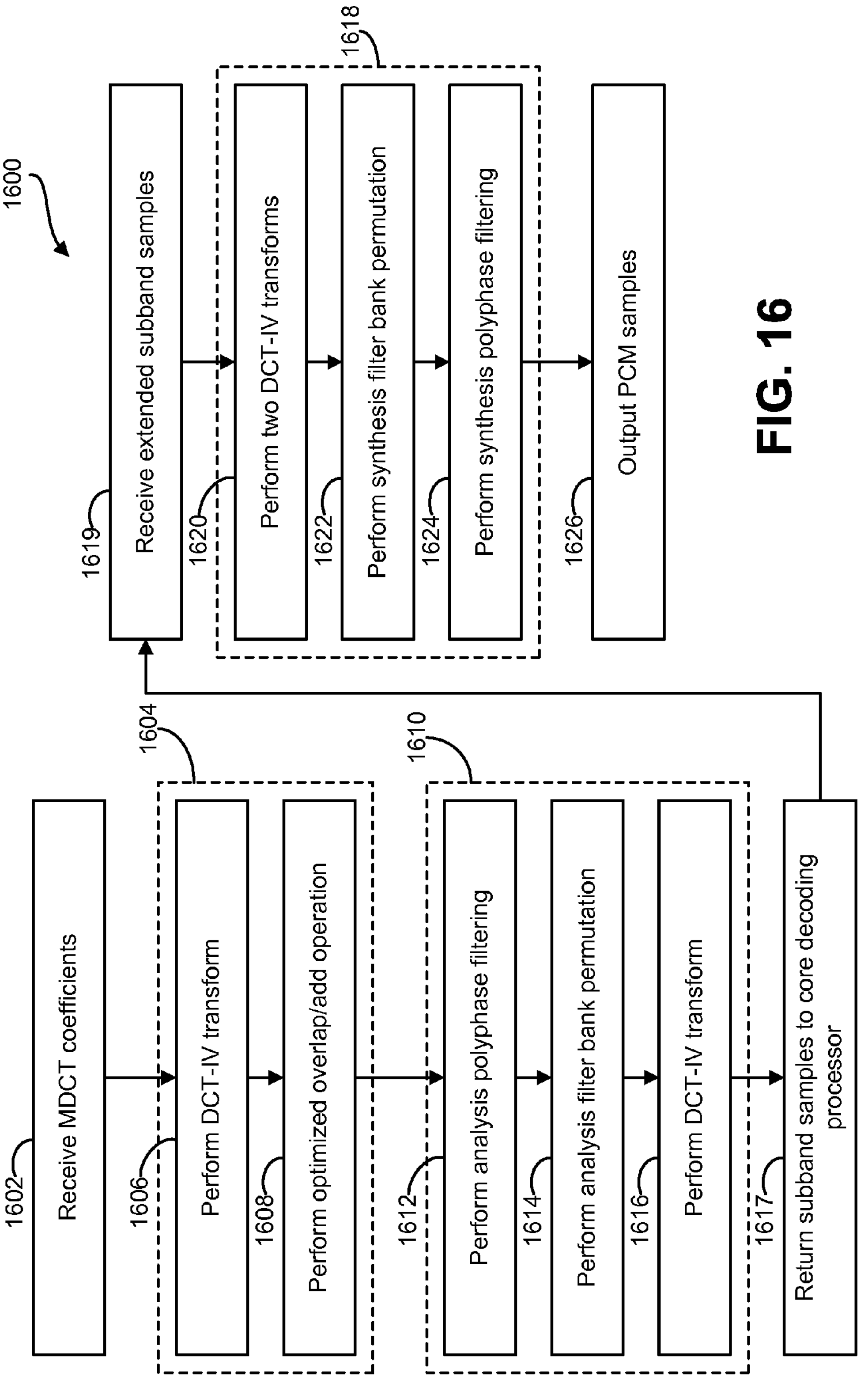
FIG. 16 illustrates a method for frequency-to-time and time-to-frequency conversions when an HE-AAC or an HE-AAC v2 bitstream is being decoded.

FIG. 16 illustrates a method 1600 for frequency-to-time and time-to-frequency conversions when an HE-AAC type bitstream is being decoded. The method 1600 may be implemented by a unified filter bank block 1524.

The method 1600 may include receiving 1602 MDCT coefficients 1552 and performing 1604 the IMDCT and an overlap/add operation. As discussed above, performing 1604 the IMDCT and the overlap/add operation may be accomplished by performing 1606 the DCT-IV transform and performing 1608 an optimized overlap/add operation.

The method 1600 may also involve implementing 1610 an analysis filter bank. As discussed above, implementing an analysis filter bank may involve performing 1612 analysis polyphase filtering, performing 1614 an analysis filter bank permutation, and performing 1616 a DCT-IV transform. Analysis polyphase filtering may be performed in accordance with equations (6) and (7) above. The analysis filter bank permutation may be performed in accordance with equations (9), (10), and (11) above. The DCT-IV transform may be performed in accordance with equation (12) above. Subband samples 1580 produced by the analysis filter bank may be returned 1617 to the core decoding processor 1504.

The unified filter bank block 1524 may receive 1619 extended subband samples 1557. The method 1600 may also involve implementing 1618 a synthesis filter bank. As discussed above, implementing 1618 a synthesis filter bank may involve performing 1620 two DCT-IV transforms, performing 1622 a synthesis filter bank permutation, and performing 1624 synthesis polyphase filtering. The DCT-IV transforms may be performed in accordance with equations (15) and (16) above. The synthesis filter bank permutation may be performed in accordance with equation (17) above. Synthesis polyphase filtering may be performed in the manner described above. The method 1600 may also include outputting 1526 PCM samples 1556*b*.

Figure 17:
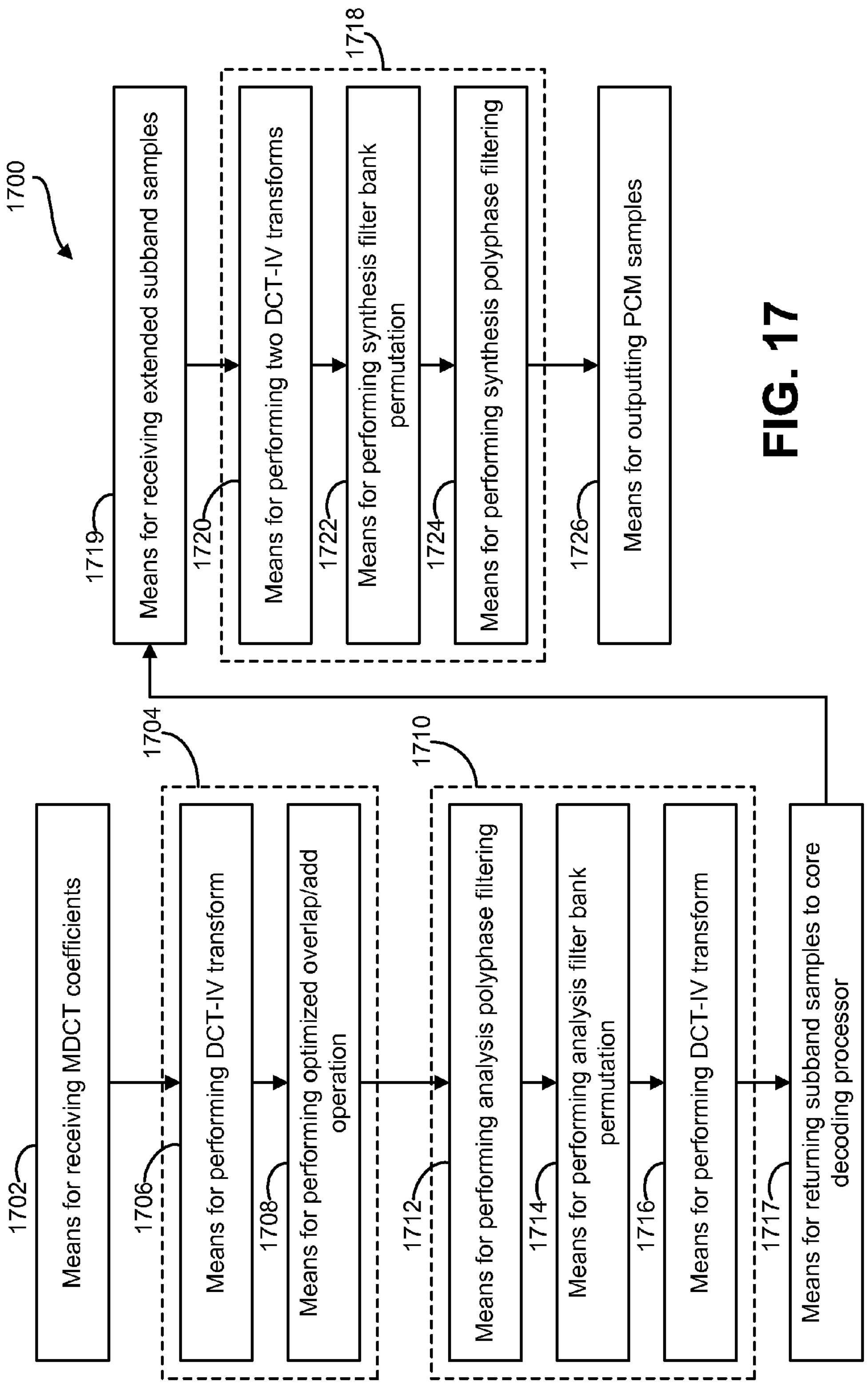
FIG. 17 illustrates means-plus-function blocks corresponding to the method shown in FIG. 16.

The method 1600 of FIG. 16 described above may be performed by various hardware and/or software component(s) and/or module(s) corresponding to the means-plus-function blocks 1700 illustrated in FIG. 17. In other words, blocks 1602 through 1626 illustrated in FIG. 16 correspond to means-plus-function blocks 1702 through 1726 illustrated in FIG. 17.

The next example relates to performing domain conversions as part of decoding a WMA or a WMA Pro bitstream. In this discussion, the term "WMA type bitstream" refers to either a WMA bitstream or a WMA Pro bitstream.

Figure 18:
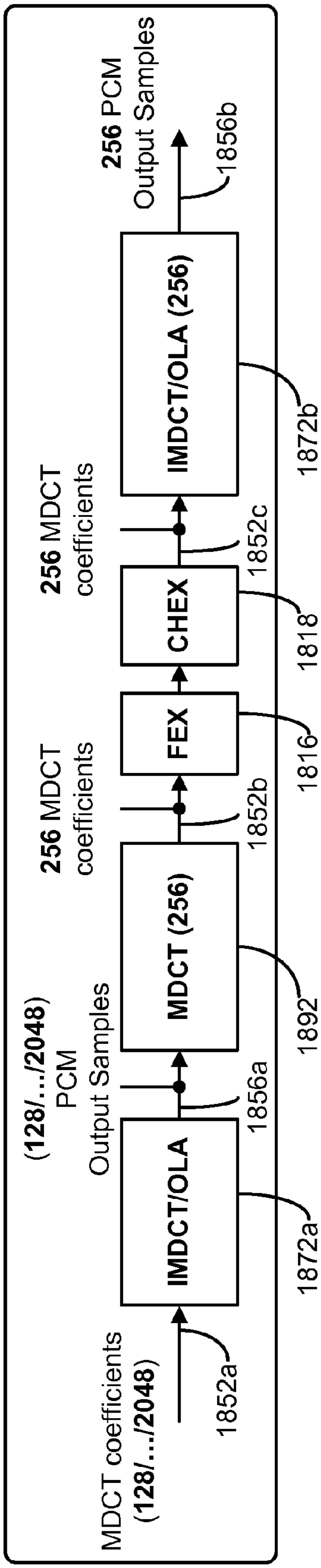
FIG. 18 illustrates one possible approach for frequency-to-time and/or time-to-frequency conversion(s) as part of decoding a WMA or a WMA Pro bitstream.

Performing frequency-to-time and/or time-to-frequency conversions as part of decoding a WMA type bitstream may involve performing the IMDCT, performing the overlap/add operation, and performing the MDCT. This is shown in FIG. 18. MDCT coefficients 1852*a* are shown being provided as input to an IMDCT/OLA (overlap/add) component 1872*a*. The IMDCT/OLA component 1872*a* is shown outputting PCM samples 1856*a*.

The PCM samples 1856*a* are shown being provided as input to a component 1892 that performs the MDCT. The MDCT component 1892 is shown outputting MDCT coefficients 1852*b*.

The MDCT coefficients 1852*b* are shown being provided as input to a component 1816 that performs frequency extension processing. The output of the frequency extension processing component 1816 is shown being provided as input to a component 1818 that performs channel extension processing. The channel extension processing component 1818 is shown outputting MDCT coefficients 1852*c*.

The MDCT coefficients 1852*c* are shown being provided as input to another IMDCT/OLA component 1872*b*. The IMDCT/OLA component 1872*b* is shown outputting PCM samples 1856*b*.

The MDCT may be implemented by performing a permutation (which may be referred to as an MDCT permutation) and then performing a DCT-IV transform. The MDCT permutation may be performed in accordance with equation (18):

$$\text{For } n=0, 1, \ldots, 127,$$

$$u(n+128)=x(n)-x(255-n)$$

$$u(127-n)=-x(511-n)-x(n+256) \quad (18)$$

The DCT-IV transform may be performed in accordance with equation (19):

$$\text{For } k = 0, 1, \ldots, 255, \quad (19)$$

$$X(k) = \sum_{n=0}^{255} u(n)\cos\left\{\frac{\pi}{256}\left(n+\frac{1}{2}\right)\left(k+\frac{1}{2}\right)\right\}$$

Figure 19:
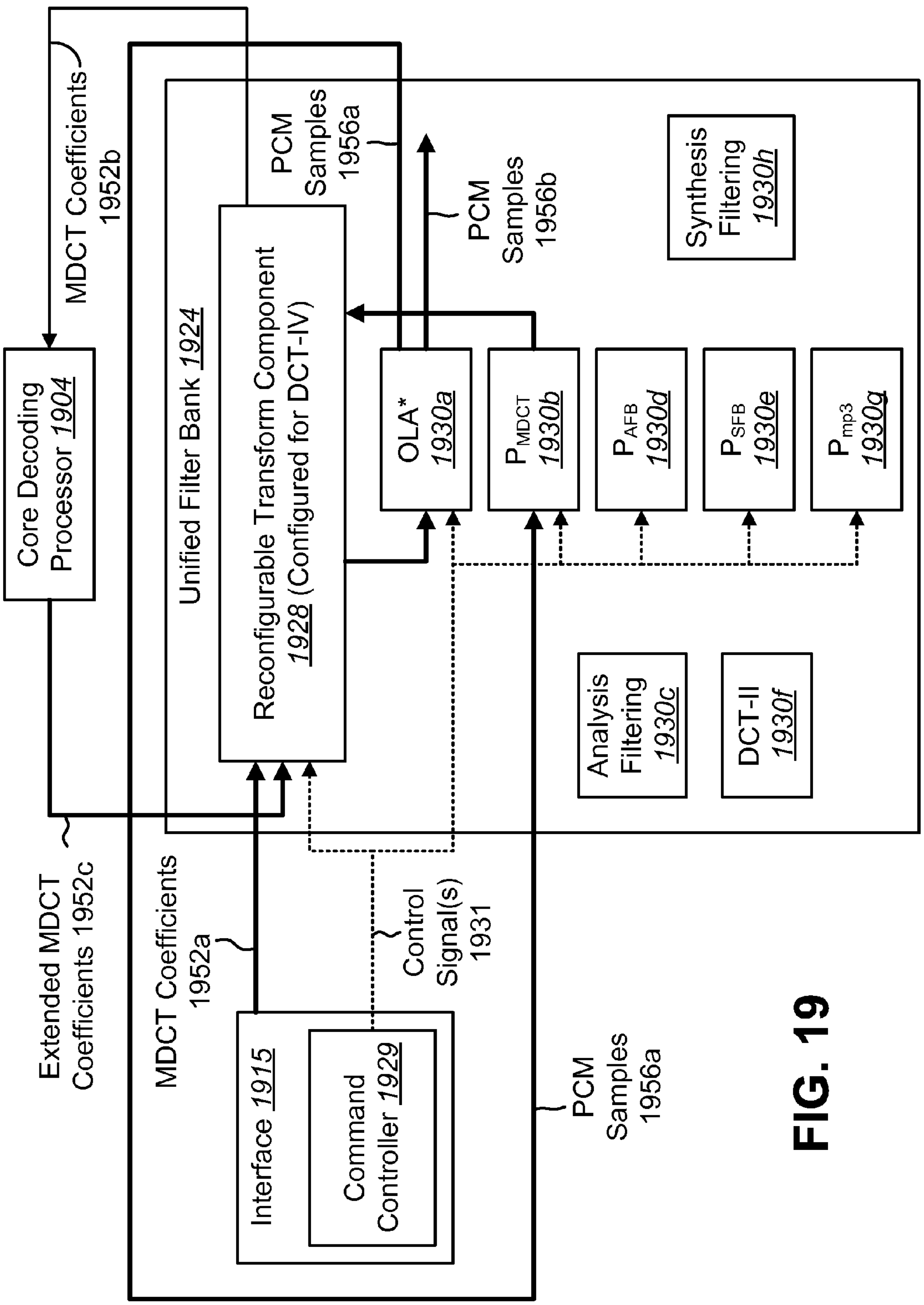
FIG. 19 illustrates one possible way that frequency-to-time and/or time-to-frequency conversion(s) may be implemented by a unified filter bank block when a WMA or a WMA Pro bitstream is being decoded.

FIG. 19 illustrates one possible way that frequency-to-time and/or time-to-frequency conversion(s) may be implemented by a unified filter bank block 1924 when a WMA type bitstream is being decoded. The unified filter bank block 1924 is similar to the unified filter bank block 324 of FIG. 3. The unified filter bank block 1924 is shown with a reconfigurable transform component 1928, an optimized overlap/add component 1930*a*, an MDCT permutation component 1930*b*, an analysis polyphase filtering component 1930*c*, an analysis filter bank permutation component 1930*d*, a synthesis filter bank permutation component 1930*e*, a DCT-II transform component 1930*f*, an MP3 permutation component 1930*g*, and a synthesis polyphase filtering component 1930*h*.

As discussed above, performing frequency-to-time and/or time-to-frequency conversion(s) for a WMA type bitstream may involve performing the IMDCT followed by performing an overlap/add operation. This may be accomplished by a performing a DCT-IV transform and then performing an optimized overlap/add operation. Performing frequency-to-time and/or time-to-frequency conversion(s) for a WMA type bitstream may also involve performing the MDCT. This may be accomplished by performing an MDCT permutation and then performing the DCT-IV transform. Performing frequency-to-time and/or time-to-frequency conversion(s) for a WMA type bitstream may also involve performing the IMDCT a second time followed by performing an overlap/add operation a second time. An example showing how the unified filter bank block 1924 may be used to perform these operations will now be described.

An interface command controller 1929 may send control signal(s) 1931 to the reconfigurable transform component 1928. The control signals 1931 are shown in dotted lines in FIG. 19. The control signal(s) 1931 may cause the reconfigurable transform component 1928 to become configured to implement the DCT-IV.

The interface command controller 1929 may also send control signal(s) 1931 to the optimized overlap/add component 1930*a*, the MDCT permutation component 1930*b*, the analysis filter bank permutation component 1930*d*, the synthesis filter bank permutation component 1930*e*, and the MP3 permutation component 1930*g*. The control signal(s) 1931 may cause these complementary modules 1930*a*, 1930*b*, 1930*d*, 1930*e*, 1930*g* to become configured to implement permutations that depend on the DCT-IV. The control signals 1931 may also cause appropriate data path connections to be established between the various components. The control signals 1931 may also cause the execution of the components in a specific order. The data path connections, and the order in which the execution of the components occurs, will be described in greater detail immediately below.

MDCT coefficients 1952*a* may be provided as input to the reconfigurable transform component 1928 (which, as indicated above, may be configured for the DCT-IV transform). The MDCT coefficients 1952*a* may be received via an interface 1915. The MDCT coefficients 1952*a* may be sent to the unified filter bank block 1924, or fetched by the unified filter bank block 1924. The interface 1915 may be the interface 115 in the audio playback system 100 of FIG. 1. The reconfigurable transform component 1928 may perform the DCT-IV transform as described above. The result of the DCT-IV transform may be provided to the optimized overlap/add component 1930*a*. The optimized overlap/add component 1930*a* may perform the optimized overlap/add operation as described above. PCM samples 1956*a* may be output from the optimized overlap/add component 1930*a*.

The PCM samples 1956*a* output by the optimized overlap/add component 1930*a* may be fed back and provided as input to the MDCT permutation component 1930*b*. The output of the MDCT permutation component 1930*b* may be provided as input to the reconfigurable transform component 1928 (which, as indicated above, may be configured for the DCT-IV transform). MDCT coefficients 1952*b* are shown being output by the reconfigurable transform component 1928.

The MDCT coefficients 1952*b* output by the reconfigurable transform component 1928 may be fed back to the core decoding processor 1904 for performing frequency extension processing and channel extension processing. The core decoding processor 1904 may output extended MDCT coefficients 1952*c*. These extended MDCT coefficients 1952*c* may be provided as input to the unified filter bank block 1924. The core decoding processor 1904 may also send a command to perform the IMDCT on the provided inputs. The command may make the input to the unified filter bank block 1924 as the input to the reconfigurable transform component 1928, which may perform the DCT-IV transform. The result of the DCT-IV transform may be provided to the optimized overlap/add component 1930*a*. The optimized overlap/add component 1930*a* may perform the optimized overlap/add operation as described above. PCM samples 1956*b* may be output from the optimized overlap/add component 1930*a*.

Figure 20:
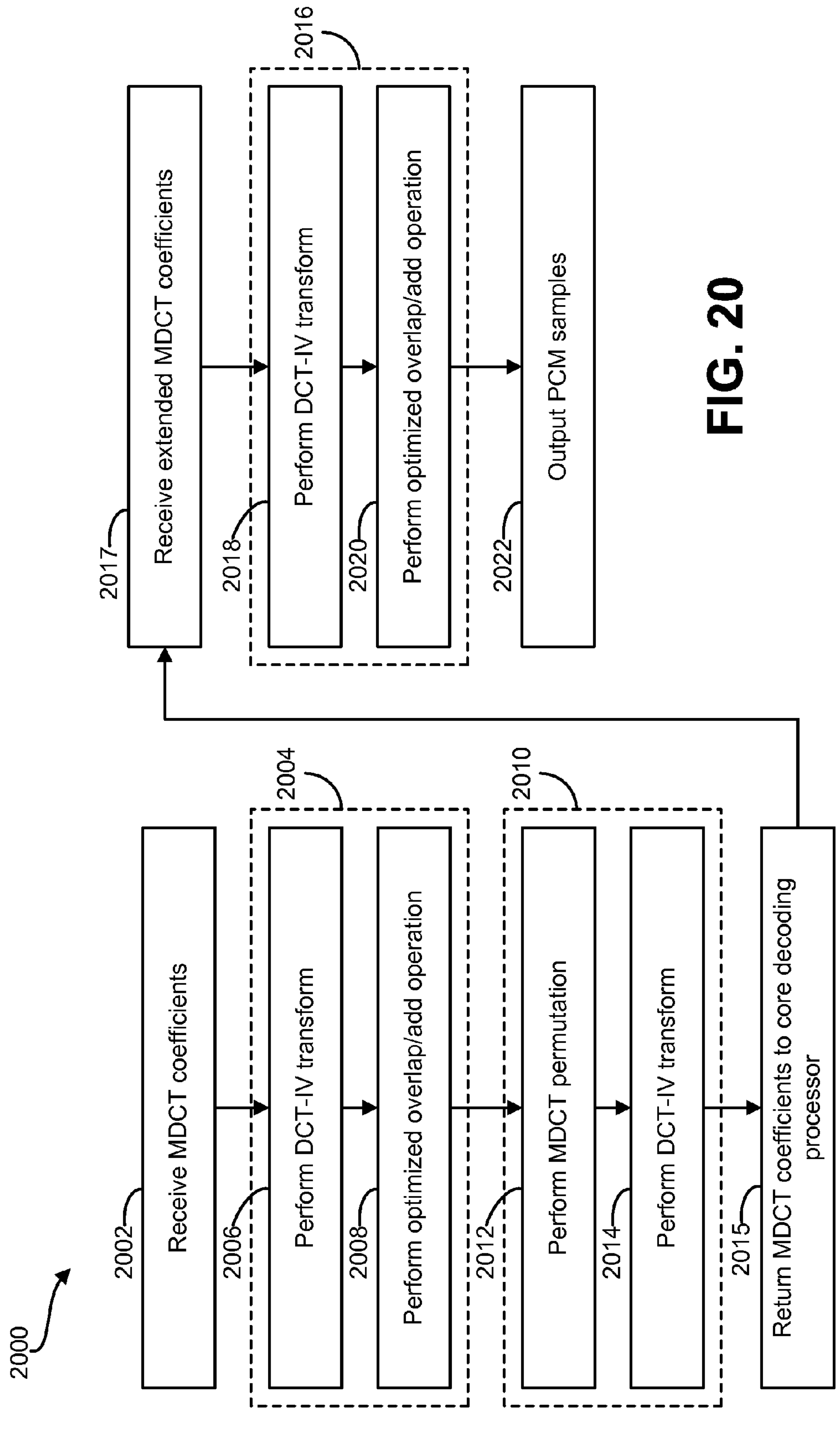
FIG. 20 illustrates a method for frequency-to-time and/or time-to-frequency conversion(s) when a WMA or a WMA Pro bitstream is being decoded.

FIG. 20 illustrates a method 2000 for frequency-to-time and/or time-to-frequency conversion(s) when a WMA type bitstream is being decoded. The method 2000 may be implemented by a unified filter bank block 1924.

The method 2000 may include receiving 2002 MDCT coefficients 1952*a* and performing 2004 the IMDCT and an overlap/add operation. As discussed above, performing 2004 the IMDCT and the overlap/add operation may be accomplished by performing 2006 the DCT-IV transform and performing 2008 an optimized overlap/add operation.

The method 2000 may also include performing 2010 the MDCT. As discussed above, the MDCT may be implemented 2010 by performing 2012 an MDCT permutation and performing 2014 the DCT-IV transform.

MDCT coefficients 1952*b* may be returned 2015 to the core decoding processor 1904. The core decoding processor 1904 may perform frequency extension processing and channel extension processing. The unified filter bank block 1924 may then receive 2017 extended MDCT coefficients 1952*c*.

The method 2000 may also include performing 2016 the IMDCT and the overlap/add operation a second time. As discussed above, performing 2016 the IMDCT and the overlap/add operation may be accomplished by performing 2018 the DCT-IV transform and performing 2020 an optimized overlap/add operation. The method 2000 may also include outputting 2022 PCM samples 2056*b*.

Figure 21:
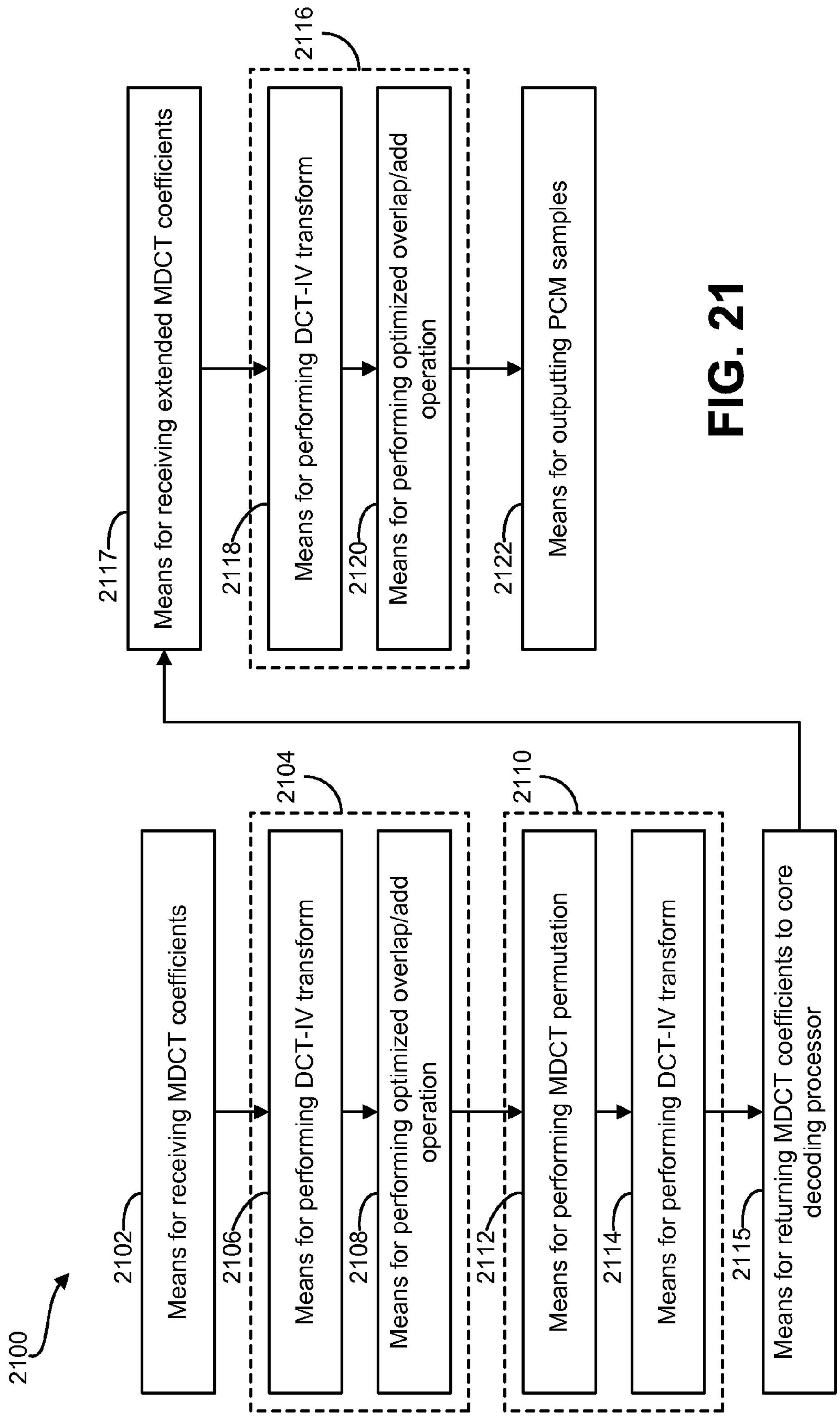
FIG. 21 illustrates means-plus-function blocks corresponding to the method shown in FIG. 20.

The method 2000 of FIG. 20 described above may be performed by various hardware and/or software component(s) and/or module(s) corresponding to the means-plus-function blocks 2100 illustrated in FIG. 21. In other words, blocks 2002 through 2022 illustrated in FIG. 20 correspond to means-plus-function blocks 2102 through 2122 illustrated in FIG. 21.

Figure 22:
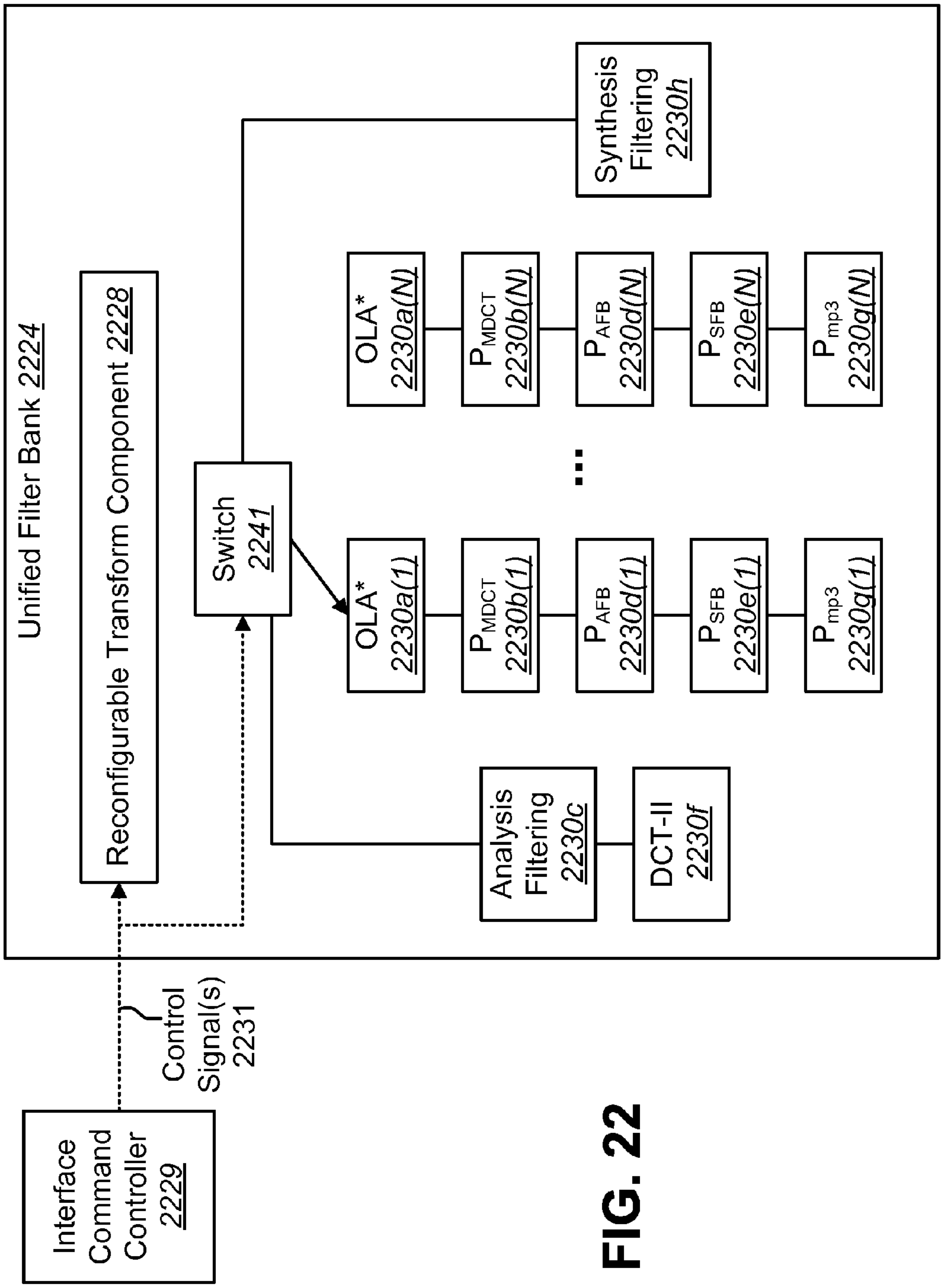
FIG. 22 illustrates another example of a unified filter bank block.

FIG. 22 illustrates another example of a unified filter bank block 2224. The unified filter bank block 2224 is similar to the unified filter bank block 324 of FIG. 3, except as described below. The unified filter bank block 2224 includes a reconfigurable transform component 2228 and various complementary modules 2230.

The unified filter bank block 2224 includes multiple sets of some of the complementary modules. For example, the unified filter bank block 2224 includes N sets of optimized overlap/add operation components 2230*a*(1) . . . 2230*a*(N). The unified filter bank block 2224 also includes N sets of MDCT permutation components 2230*b*(1) . . . 2230*b*(N). The unified filter bank block 2224 also includes N sets of analysis filter bank permutation components 2230*d*(1) . . . 2230*d*(N). The unified filter bank block 2224 also includes N sets of synthesis filter bank permutation components 2230*e*(1) . . . 2230*e*(N). The unified filter bank block 2224 also includes N sets of MP3 permutation components 2230*g*(1) . . . 2230*g*(N). Different sets of complementary modules 2230 may correspond to different transforms implemented by the reconfigurable transform component 2228.

The unified filter bank block 2224 also includes an analysis polyphase filtering component 2230*c*, a DCT-II transform component 2230*f*, and a synthesis polyphase filtering component 2230*h*.

An interface command controller 2229 may send control signal(s) 2231 to the reconfigurable transform component 2228. The transform that is implemented by the reconfigurable transform component 2228 may depend on the control signal(s) 2231 received from the interface command controller 2229. The control signals 2231 may also cause appropriate data path connections to be established between the various components. The control signals 2231 may also cause the execution of the components in a specific order.

The interface command controller 2229 may also send control signal(s) 2231 to a switch 2241. As indicated above, the unified filter bank block 2224 includes multiple sets of some of the complementary modules 2230. Which of these complementary modules are used may depend on the transform that is being implemented by the reconfigurable transform component 2228. The switch 2241 may select which of these complementary modules 2230 are to be used depending on the control signal(s) 2231 received from the interface command controller 2229. In FIG. 22, the switch 2241 is shown selecting a set of complementary modules 2230 comprising the first optimized overlap/add operation component 2230*a*(1), the first MDCT permutation component 2230*b*(1), the first analysis filter bank permutation component 2230*d*(1), the first synthesis filter bank permutation component 2230*e*(1), and the first MP3 permutation component 2230*g*(1).

Figure 23:
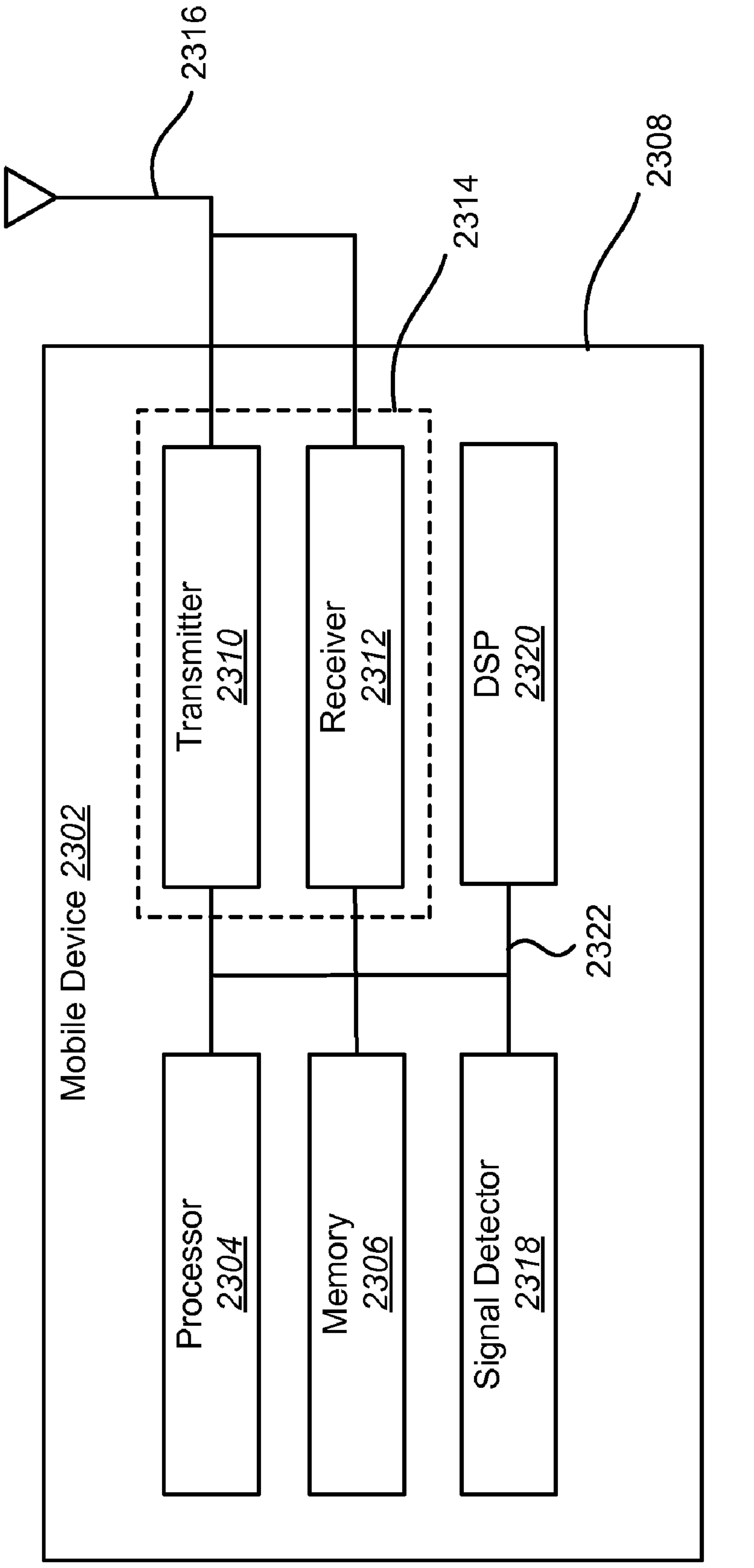
FIG. 23 illustrates various components that may be utilized in a mobile device.

FIG. 23 illustrates various components that may be utilized in a mobile device 2302. The mobile device 2302 is an example of a device that may be configured to implement the various methods described herein.

The mobile device 2302 may include a processor 2304 which controls operation of the mobile device 2302. The processor 2304 may also be referred to as a central processing unit (CPU). Memory 2306, which may include both read-only memory (ROM) and random access memory (RAM), provides instructions and data to the processor 2304. A portion of the memory 2306 may also include non-volatile random access memory (NVRAM). The processor 2304 typically performs logical and arithmetic operations based on program instructions stored within the memory 2306. The instructions in the memory 2306 may be executable to implement the methods described herein.

The mobile device 2302 may also include a housing 2308 that may include a transmitter 2310 and a receiver 2312 to allow transmission and reception of data between the mobile device 2302 and a remote location. The transmitter 2310 and receiver 2312 may be combined into a transceiver 2314. An antenna 2316 may be attached to the housing 2308 and electrically coupled to the transceiver 2314. The mobile device 2302 may also include (not shown) multiple transmitters, multiple receivers, multiple transceivers and/or multiple antenna.

The mobile device 2302 may also include a signal detector 2318 that may be used to detect and quantify the level of signals received by the transceiver 2314. The signal detector 2318 may detect such signals as total energy, pilot energy per pseudonoise (PN) chips, power spectral density, and other signals. The mobile device 2302 may also include a digital signal processor (DSP) 2320 for use in processing signals.

The various components of the mobile device 2302 may be coupled together by a bus system 2322 which may include a power bus, a control signal bus, and a status signal bus in addition to a data bus. However, for the sake of clarity, the various busses are illustrated in FIG. 23 as the bus system 2322.

In accordance with the present disclosure, a circuit in a mobile device may be adapted to receive signal conversion commands and accompanying data in relation to multiple types of compressed audio bitstreams. The same circuit, a different circuit, or a second section of the same or different circuit may be adapted to perform a transform as part of signal conversion for the multiple types of compressed audio bitstreams. The second section may advantageously be coupled to the first section, or it may be embodied in the same circuit as the first section. In addition, the same circuit, a different circuit, or a third section of the same or different circuit may be adapted to perform complementary processing as part of the signal conversion for the multiple types of compressed audio bitstreams. The third section may advantageously be coupled to the first and second sections, or it may be embodied in the same circuit as the first and second sections. In addition, the same circuit, a different circuit, or a fourth section of the same or different circuit may be adapted to control the configuration of the circuit(s) or section(s) of circuit(s) that provide the functionality described above. Any of the first through fourth sections may alone or in combination be part of an integrated circuit.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS.

8-9, 13-14, 17-18, and 21-22, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A unified filter bank for performing signal conversions, comprising:
- an interface that receives signal conversion commands and accompanying data in relation to multiple types of compressed audio bitstreams;
- a reconfigurable transform component that performs a transform as part of signal conversion for the multiple types of compressed audio bitstreams;
- complementary modules that perform complementary processing as part of the signal conversion for the multiple types of compressed audio bitstreams; and
- an interface command controller that controls the configuration of the reconfigurable transform component, the configuration of the complementary modules, and the order in which the complementary modules are connected and executed.

2. The unified filter bank of claim 1, wherein the complementary modules comprise an optimized overlap/add component that performs an overlap/add operation in combination with an inverse modified discrete cosine transform (IMDCT) permutation.

3. The unified filter bank of claim 1, wherein the complementary modules comprise:
- a type-II discrete cosine transform (DCT-II transform) component that performs a DCT-II transform;
- a permutation component that performs a permutation that is structured so that the DCT-II transform and the permutation collectively implement a matrix multiplication operation; and
- a synthesis polyphase filtering component that performs synthesis polyphase filtering.

4. The unified filter bank of claim 1, wherein the complementary modules comprise:
- a synthesis filter bank permutation component that performs a synthesis filter bank permutation; and
- a synthesis polyphase filtering component that performs synthesis polyphase filtering.

5. The unified filter bank of claim 1, wherein the complementary modules comprise:
- an analysis polyphase filtering component that performs analysis polyphase filtering; and
- an analysis filter bank permutation component that performs an analysis filter bank permutation.

6. The unified filter bank of claim 1, wherein the complementary modules comprise a modified discrete cosine transform (MDCT) permutation component that performs an MDCT permutation.

7. The unified filter bank of claim 1, further comprising an output of the unified filter bank that is fed back into an input of the unified filter bank.

8. The unified filter bank of claim 1, wherein the unified filter bank is implemented in a mobile device.

9. A method for implementing a unified filter bank that performs signal conversions, comprising:
- receiving signal conversion commands and accompanying data in relation to multiple types of compressed audio bitstreams;
- performing at least one transform as part of signal conversion for the multiple types of compressed audio bitstreams;
- performing complementary processing as part of the signal conversion for the multiple types of compressed audio bitstreams; and
- controlling the configuration of a reconfigurable transform component that performs the at least one transform, the configuration of complementary modules that perform the complementary processing, and the order in which the complementary modules are connected and executed.

10. The method of claim 9, wherein performing complementary processing comprises performing an overlap/add operation in combination with an inverse modified discrete cosine transform (IMDCT) permutation.

11. The method of claim 9, wherein performing complementary processing comprises:
- performing a type-II discrete cosine transform (DCT-II transform);
- performing a permutation that is structured so that the DCT-II transform and the permutation collectively implement a matrix multiplication operation; and
- performing synthesis polyphase filtering.

12. The method of claim 9, wherein performing complementary processing comprises:
- performing a synthesis fitter bank permutation; and
- performing synthesis polyphase filtering.

13. The method of claim 9, wherein performing complementary processing comprises:
- performing analysis polyphase filtering; and
- performing an analysis filter bank permutation.

14. The method of claim 9, wherein performing complementary processing comprises performing a modified discrete cosine transform (MDCT) permutation.

15. The method of claim 9, further comprising feeding back an output of the unified filter bank into an input of the unified filter bank.

16. The method of claim 9, wherein the unified filter bank is implemented in a mobile device.

17. An apparatus for implementing a unified filter bank that performs signal conversions, comprising:
- means for receiving signal conversion commands and accompanying data in relation to multiple types of compressed audio bitstreams;
- means for performing at least one transform as part of signal conversion for the multiple types of compressed audio bitstreams;
- means for performing complementary processing as part of the signal conversion for the multiple types of compressed audio bitstreams; and
- means for controlling the configuration of a reconfigurable transform component that performs the at least one transform, the configuration of complementary modules that perform the complementary processing, and the order in which the complementary modules are connected and executed.

18. The apparatus of claim 17, wherein the means for performing complementary processing comprises means for performing an overlap/add operation in combination with an inverse modified discrete cosine transform (IMDCT) permutation.

19. The apparatus of claim 17, wherein the means for performing complementary processing comprises:

means for performing a type-II discrete cosine transform (DCT-II transform);

means for performing a permutation that is structured so that the DCT-II transform and the permutation collectively implement a matrix multiplication operation; and means for performing synthesis polyphase filtering.

20. The apparatus of claim 17, wherein the means for performing complementary processing comprises:

means for performing a synthesis filter bank permutation; and means for performing synthesis polyphase filtering.

21. The apparatus of claim 17, wherein the means for performing complementary processing comprises:

means for performing analysis polyphase filtering; and means for performing an analysis filter bank permutation.

22. The apparatus of claim 17, wherein the means for performing complementary processing comprises means for performing a modified discrete cosine transform (MDCT) permutation.

23. The apparatus of claim 17, further comprising means for feeding back an output of the unified filter bank into an input of the unified filter bank.

24. The apparatus of claim 17, wherein the apparatus is a mobile device.

25. A computer-readable medium comprising instructions for implementing a unified filter bank, which when executed by a processor cause the processor to:

receive signal conversion commands and accompanying data in relation to multiple types of compressed audio bitstreams;

perform at least one transform as part of signal conversion for the multiple types of compressed audio bitstreams;

perform complementary processing as part of the signal conversion for the multiple types of compressed audio bitstreams; and control the configuration of a reconfigurable transform component that performs the at least one transform, the configuration of complementary modules that perform the complementary processing, and the order in which the complementary modules are connected and executed.

26. The computer-readable medium of claim 25, wherein performing complementary processing comprises performing an overlap/add operation in combination with an inverse modified discrete cosine transform (IMDCT) permutation.

27. The computer-readable medium of claim 25, wherein performing complementary processing comprises:

performing a type-II discrete cosine transform (DCT-II transform);

performing a permutation that is structured so that the DCT-II transform and the permutation collectively implement a matrix multiplication operation; and performing synthesis polyphase filtering.

28. The computer-readable medium of claim 25, wherein performing complementary processing comprises:

performing a synthesis filter bank permutation; and performing synthesis polyphase filtering.

29. The computer-readable medium of claim 25, wherein performing complementary processing comprises:

performing analysis polyphase filtering; and performing an analysis filter bank permutation.

30. The computer-readable medium of claim 25, wherein performing complementary processing comprises performing a modified discrete cosine transform (MDCT) permutation.

31. The computer-readable medium of claim 25, wherein the instructions also cause the processor to feed back an output of the unified filter bank into an input of the unified filter bank.

32. The computer-readable medium of claim 25, wherein the unified filter bank is implemented in a mobile device.

33. An integrated circuit for implementing a unified filter bank, the integrated circuit being configured to:

receive signal conversion commands and accompanying data in relation to multiple types of compressed audio bitstreams;

perform at least one transform as part of signal conversion for the multiple types of compressed audio bitstreams;

perform complementary processing as part of the signal conversion for the multiple types of compressed audio bitstreams; and control the configuration of a reconfigurable transform component that performs the at least one transform, the configuration of complementary modules that perform the complementary processing, and the order in which the complementary modules are connected and executed.

34. The integrated circuit of claim 33, wherein performing complementary processing comprises performing an overlap/add operation in combination with an inverse modified discrete cosine transform (IMDCT) permutation.

35. The integrated circuit of claim 33, wherein performing complementary processing comprises:

performing a type-II discrete cosine transform (DCT-II transform);

performing a permutation that is structured so that the DCT-II transform and the permutation collectively implement a matrix multiplication operation; and performing synthesis polyphase filtering.

36. The integrated circuit of claim 33, wherein performing complementary processing comprises:

performing a synthesis filter bank permutation; and performing synthesis polyphase filtering.

37. The integrated circuit of claim 33, wherein performing complementary processing comprises:

performing analysis polyphase filtering; and performing an analysis filter bank permutation.

38. The integrated circuit of claim 33, wherein performing complementary processing comprises performing a modified discrete cosine transform (MDCT) permutation.

39. The integrated circuit of claim 33, wherein the integrated circuit is further configured to feed back an output of the unified filter bank into an input of the unified filter bank.

40. The integrated circuit of claim 33, wherein the unified filter bank is implemented in a mobile device.

* * * * *